US009892708B2

(12) United States Patent
Yano

(10) Patent No.: US 9,892,708 B2
(45) Date of Patent: Feb. 13, 2018

(54) IMAGE PROCESSING TO REDUCE HOLD BLURR FOR IMAGE DISPLAY

(71) Applicant: SONY CORPORATION, Tokyo (JP)

(72) Inventor: Tomoya Yano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1216 days.

(21) Appl. No.: 13/895,133

(22) Filed: May 15, 2013

(65) Prior Publication Data

US 2013/0335386 A1 Dec. 19, 2013

(30) Foreign Application Priority Data

Jun. 14, 2012 (JP) ................................ 2012-134372

(51) Int. Cl.
*G06F 1/00* (2006.01)
*G09G 5/00* (2006.01)
*G09G 5/02* (2006.01)

(52) U.S. Cl.
CPC ................ *G09G 5/00* (2013.01); *G09G 5/02* (2013.01); *G09G 2340/0435* (2013.01); *G09G 2340/0457* (2013.01)

(58) Field of Classification Search
CPC ............ H04N 5/253; G09G 3/00; G09G 1/00; G09G 2310/08; G09G 3/2003; G09G 3/3233; G06F 1/00; G06F 3/044
See application file for complete search history.

(56) References Cited

U.S. PATENT DOCUMENTS

2004/0027363 A1* 2/2004 Allen .................... G09G 3/002 345/698
2009/0122081 A1* 5/2009 Tsubaki .................... G06F 3/14 345/619
2010/0053429 A1* 3/2010 Miyazaki ............... H04N 7/014 348/513

FOREIGN PATENT DOCUMENTS

JP 2008-268436 A 11/2008

* cited by examiner

*Primary Examiner* — Michael Faragalla
(74) *Attorney, Agent, or Firm* — Chip Law Group

(57) ABSTRACT

A display includes: a display section including a plurality of subpixels; and a display driving section driving the display section, based on a first image data set and a second image data set that alternate with each other. The display driving section assigns a predetermined number of subpixels to one pixel, performs first display driving based on the first image data set, and performs second display driving based on the second image data set, and a displacement equivalent to one or a plurality of subpixels is provided between a pixel to be driven by the first display driving and a pixel to be driven by the second display driving.

19 Claims, 19 Drawing Sheets

| | | |
|---|---|---|
| 0 | 1 | 0 |
| 1 | 2 | 1 |
| 0 | 1 | 0 |

IMAGE PROCESSING TO REDUCE HOLD BLURR FOR IMAGE DISPLAY

BACKGROUND

The disclosure relates to a display displaying an image, an image processing unit used for such a display, and a display method.

In recent years, replacement of CRT (Cathode Ray Tube) displays with liquid crystal displays and organic Electro-Luminescence (EL) displays has been proceeding. These replacing displays are so-called hold-type display devices. This type of display keeps displaying the same image over one frame period during which a still image is displayed until the next still image is displayed. When a viewer views a moving object displayed on this type of display, the viewer tries to recognize the moving object while following this object smoothly. Thus, an image on a retina moves across the center of the retina during this one frame period. Therefore, when viewing a moving image displayed on this type of display, the viewer perceives degradation in image quality due to occurrence of a so-called hold blur.

Some studies have been made for a way of addressing this hold blur. For example, Japanese Unexamined Patent Application Publication No. 2008-268436 discloses a liquid crystal display that attempts to reduce a hold blur by performing blinking driving of backlight to shorten image hold time. In addition, for example, Japanese Unexamined Patent Application Publication No. 2010-56694 discloses a display that attempts to reduce a hold blur by performing frame rate conversion.

Meanwhile, there are displays in which each pixel is configured of four subpixels. For instance, Japanese Unexamined Patent Application Publication No. 2010-33009 discloses a display that is capable of, for example, increasing white luminance or reducing power consumption, by configuring each pixel with subpixels of red, green, blue, and white. This display also has the following advantage. For example, when these four subpixels are arranged in two rows and two columns, it may be possible to reduce the number of data lines supplying pixel signals. Thus, a circuit that drives the data lines is allowed to be reduced in size, and therefore, a reduction in cost is achievable.

SUMMARY

Meanwhile, in general, improvement in image quality is expected for displays. Specifically, for instance, higher definition is expected, and a higher frame rate is also expected from the viewpoint of a response to a moving image.

It is desirable to provide a display, an image processing unit, and a display method that are capable of enhancing image quality.

According to an embodiment of the disclosure, there is provided a display including: a display section including a plurality of subpixels; and a display driving section driving the display section, based on a first image data set and a second image data set that alternate with each other. The display driving section assigns a predetermined number of subpixels to one pixel, performs first display driving based on the first image data set, and performs second display driving based on the second image data set, and a displacement equivalent to one or a plurality of subpixels is provided between a pixel to be driven by the first display driving and a pixel to be driven by the second display driving.

According to an embodiment of the disclosure, there is provided an image processing unit including: a display driving section driving a display section, based on a first image data set and a second image data set that alternate with each other. The display driving section assigns a predetermined number of subpixels to one pixel, performs first display driving based on the first image data set, and performs second display driving based on the second image data set, and a displacement equivalent to one or a plurality of subpixels is provided between a pixel to be driven by the first display driving and a pixel to be driven by the second display driving.

According to an embodiment of the disclosure, there is provided a display method including: assigning a predetermined number of subpixels to one pixel, for a display section including a plurality of subpixels; performing first display driving based on a first image data set as well as performing second display driving based on a second image data set, the first image data set and the second image data set alternating with each other; and providing a displacement between a pixel to be driven by the first display driving and a pixel to be driven by the second display driving, the displacement being equivalent to one or a plurality of subpixels.

In the display, the image processing unit, and the display method according to the above-described embodiments of the disclosure, the display is performed based on the first image data set and the second image data set that alternate with each other. At the time, the display section assigns the predetermined number of subpixels to one pixel, performs the first display driving based on the first image data set, and performs the second display driving based on the second image data set. Between the pixel to be driven by the first display driving and the pixel to be driven by the second display driving, the displacement equivalent to one or a plurality of subpixels is provided.

According to the display, the image processing unit, and the display method in the above-described embodiments of the disclosure, the displacement equivalent to one or a plurality of subpixels is provided between the pixel to be driven by the first display driving and the pixel to be driven by the second display driving. Therefore, image quality is allowed to be improved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to describe the principles of the technology.

DETAILED DESCRIPTION

Embodiments of the disclosure will be described in detail with reference to the drawings. It is to be noted that the description will be provided in the following order.

1. First Embodiment
2. Second Embodiment
3. Application Example (1. First Embodiment)

[Configuration Example]

Figure 1:
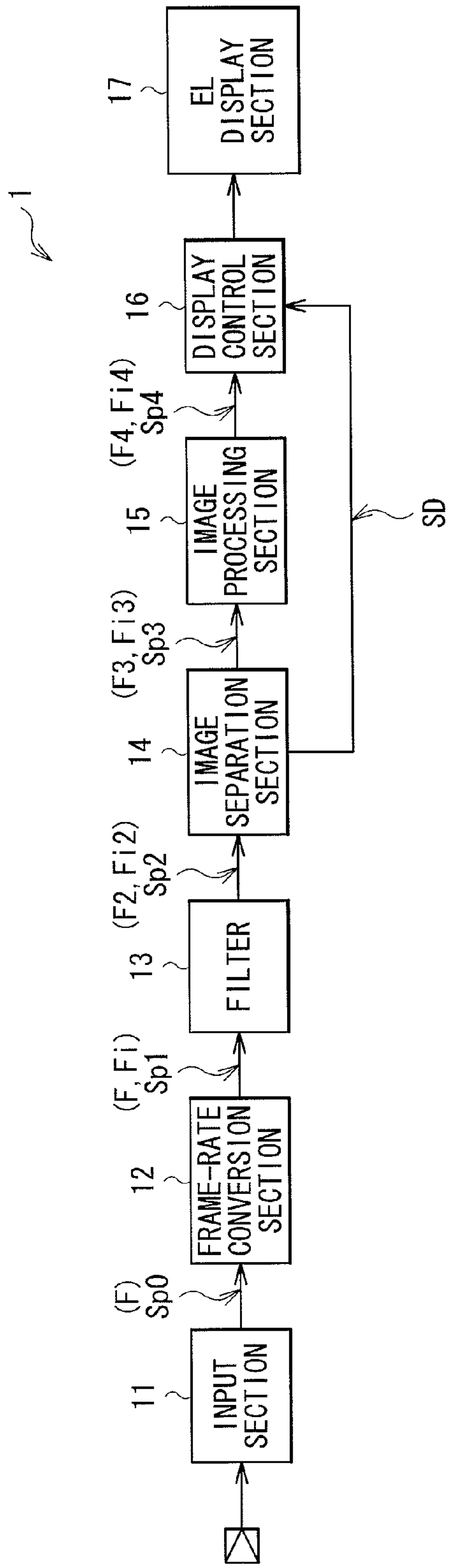
FIG. 1 is a block diagram illustrating a configuration example of a display according to a first embodiment of the disclosure.

FIG. 1 illustrates a configuration example of a display 1 according to a first embodiment. The display 1 is an EL display using an organic EL display device as a display device. It is to be noted that an image processing unit and a display method according to embodiments of the disclosure are embodied by the present embodiment and thus will be described together with the present embodiment.

The display 1 includes an input section 11, a frame-rate conversion section 12, a filter 13, an image separation section 14, an image processing section 15, a display control section 16, and an EL display section 17.

The input section 11 is an input interface, and generates and outputs an image signal Sp0 based on an image signal supplied from external equipment. In this example, the image signal supplied to the display 1 has a resolution of so-called 4k2k, and is a progressive signal of 60 frames per second. It is to be noted that the frame rate of the supplied image signal is not limited to this rate, and alternatively, may be, for example, 50 frames per second.

The frame-rate conversion section 12 generates an image signal Sp1 by performing frame rate conversion, based on the image signal Sp0 supplied from the input section 11. In this example, the frame rate is doubled by this frame rate conversion, from 60 frames per second to 120 frames per second.

Figure 2A:
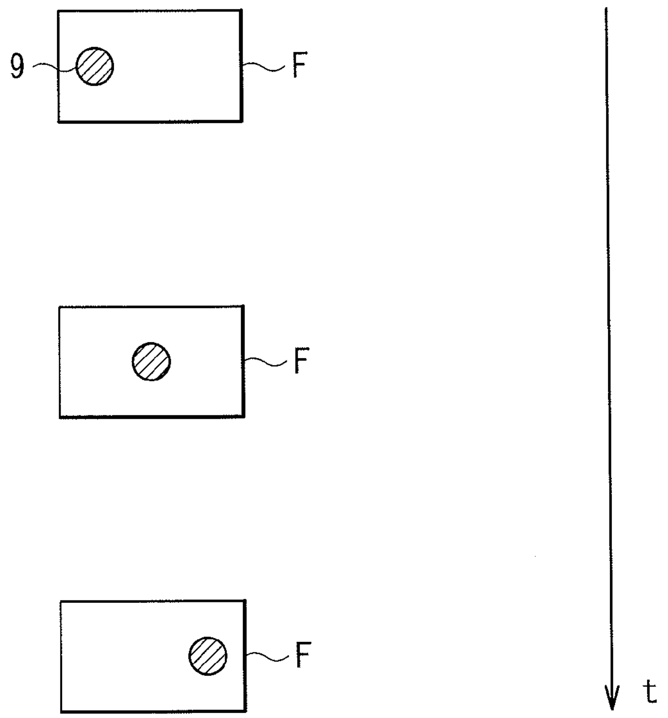
FIGS. 2A and 2B are schematic diagrams illustrating an operation example of a frame-rate conversion section illustrated in FIG. 1.
Figure 2B:
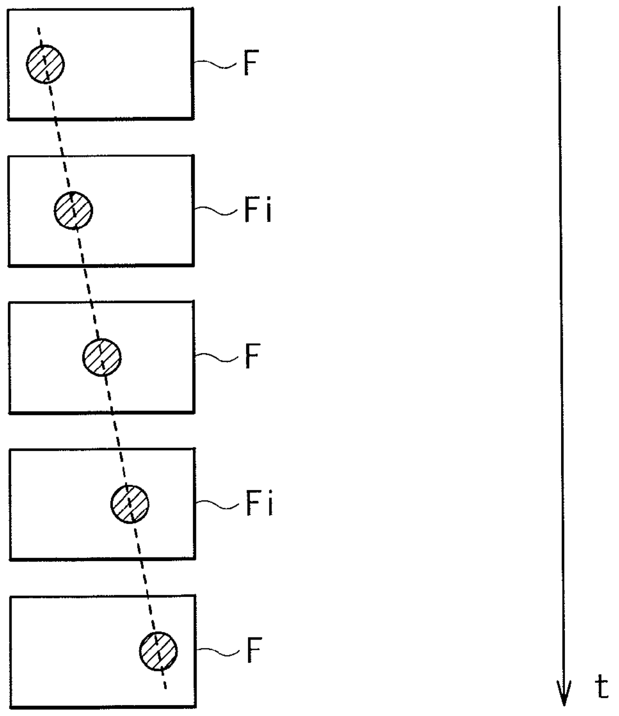

FIGS. 2A and 2B schematically illustrate the frame rate conversion. FIG. 2A illustrates images before the frame rate conversion, and FIG. 2B illustrates images after the frame rate conversion. The frame rate conversion is performed as follows. A frame image Fi is generated by interpolation processing on a time axis, based on two frame images F next to each other on the time axis. The frame image Fi is then inserted between these frame images F. For example, in a case in which a ball 9 moves from left to right as illustrated in FIG. 2A, the ball 9 may seem to be moving more smoothly by inserting the frame image Fi between the frame images F next to each other as illustrated in FIG. 2B. Besides, although a so-called hold blur, which is caused by holding a pixel state for one frame, occurs in the EL display section 17, it is possible to reduce an influence thereof by inserting the frame image Fi.

The filter 13 generates frame images F2 and Fi2 by smoothing luminance information I on each pixel, with respect to the frame images F and Fi included in the image signal Sp1, respectively. The filter 13 then outputs the generated frame images as an image signal Sp2. Specifically, in this example, the filter 13 is configured using a two-dimensional FIR (Finite Impulse Response) filter. A case in which the frame image F is smoothed will be described below as an example. It is to be noted that the following description also applies to a case in which the frame image Fi is smoothed.

Figures 3A, 3B:
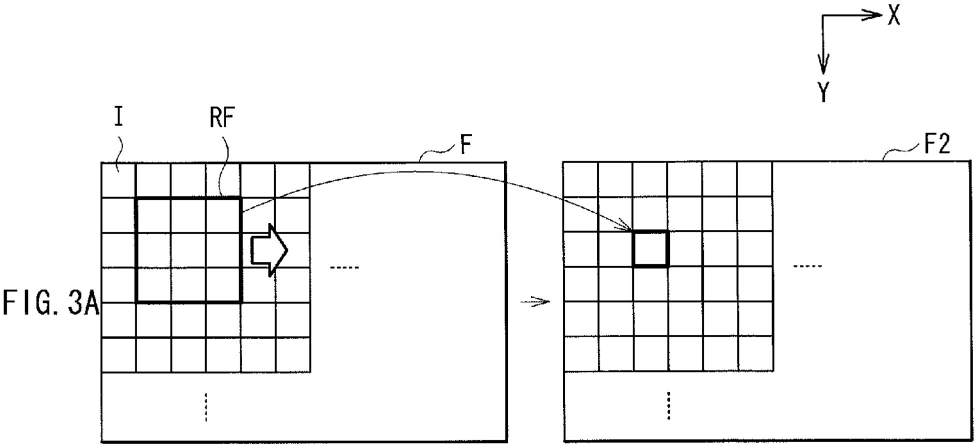
FIGS. 3A and 3B are schematic diagrams illustrating an operation example of a filter illustrated in FIG. 1.

FIGS. 3A and 3B illustrate operation of the filter 13. FIG. 3A illustrates smoothing operation, and FIG. 3B illustrates filter coefficients of the filter 13. The filter 13 has the filter coefficients in three rows and three columns as illustrated in FIG. 3B. In this example, a central filter coefficient is “2”, filter coefficients on the right, left, top, and bottom of the central filter coefficient are “1”, and other filter coefficients are “0”. The filter 13 weights a region RF of three rows and three columns in the frame image F as illustrated in FIG. 3A, by using the filter coefficients illustrated in FIG. 3B, thereby generating luminance information I on the coordinates in the center of the region RF. The filter 13 performs similar operation while shifting the region RF pixel by pixel in a horizontal direction X or a vertical direction Y in the frame image F. In this way, the filter 13 smooths the frame image F to generate the frame image F2.

The image separation section 14 separates an image F3 from the frame image F2 included in the image signal Sp2, and also separates an image Fi3 from the frame image Fi2 included in the image signal Sp2. The image separation section 14 then outputs the images F3 and Fi3 as an image signal Sp3.

Figure 4A:
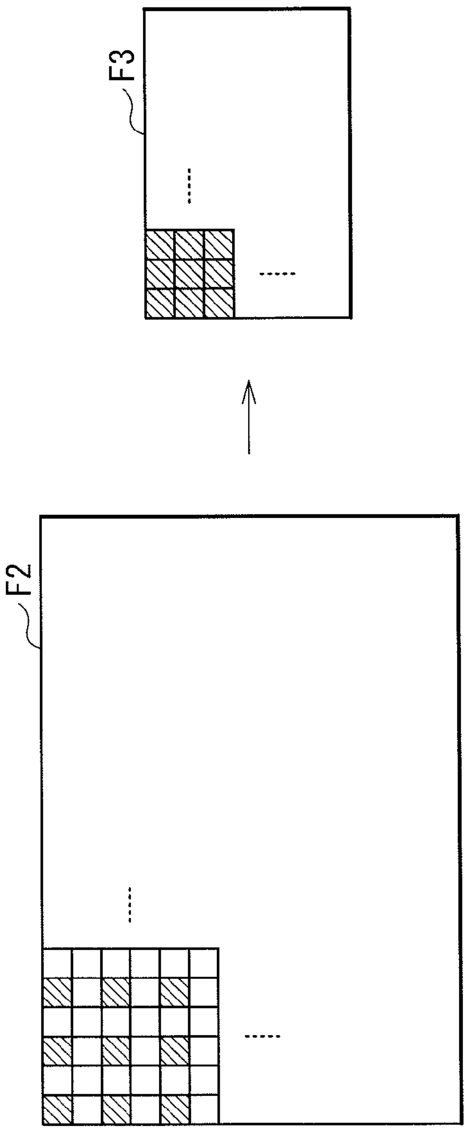
FIGS. 4A and 4B are schematic diagrams illustrating an operation example of an image separation section illustrated in FIG. 1.
Figure 4B:
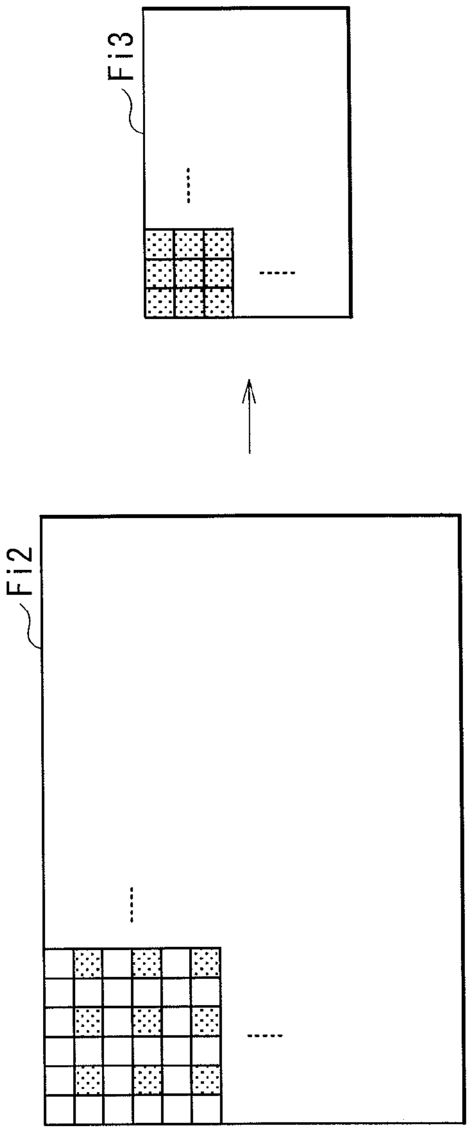

FIGS. 4A and 4B each illustrate operation of the image separation section 14. FIG. 4A illustrates operation of separating the image F3 from the frame image F2, and FIG. 4B illustrates operation of separating the image Fi3 from the frame image Fi2. As illustrated in FIG. 4A, the image separation section 14 separates pieces of luminance information I on the coordinates which are odd numbers in both of the horizontal direction X and the vertical direction Y, from the frame image F2 included in the image signal Sp2.

The image separation section 14 then generates the image F3 formed of these pieces of luminance information I. Thus, in the image F3, resolutions are half of those of the frame image F2, in both of the horizontal direction X and the vertical direction Y. Similarly, as illustrated in FIG. 4B, the image separation section 14 separates pieces of luminance information I on the coordinates which are even numbers in both of the horizontal direction X and the vertical direction Y, from the frame image Fi2 included in the image signal Sp2. The image separation section 14 then generates the image Fi3 formed of these pieces of luminance information I. Thus, in the image Fi3, resolutions are half of those of the frame image Fi2, in both of the horizontal direction X and the vertical direction Y.

In this way, the image separation section 14 generates the image signal Sp3 including the images F3 and Fi3. The image signal Sp3 has a resolution of so-called 2k1k, in this example. In other words, the image separation section 14 generates the image signal Sp3 having the resolution of 2k1k, based on the image signal Sp2 having the resolution of 4k2k.

In addition, the image separation section 14 also has a function of generating a discrimination signal SD, when separating and generating the images F3 and Fi3 as described above. The discrimination signal SD indicates whether the generated image is the image F3 or the image Fi3.

The image processing section 15 performs predetermined image processing such as color gamut enhancement and contrast enhancement, based on the image signal Sp3, and then output a result as an image signal Sp4. Specifically, the image processing section 15 performs the predetermined image processing on the image F3 included in the image signal Sp3 to generate an image F4, and also performs the predetermined image processing on the image Fi3 included in the image signal Sp3 to generate an image Fi4. The image processing section 15 then outputs these images as the image signal Sp4.

The display control section 16 controls display operation in the EL display section 17, based on the image signal Sp4 and the discrimination signal SD. The EL display section 17 uses the organic EL display device as a display device, and performs the display operation based on the control by the display control section 16.

Figure 5:
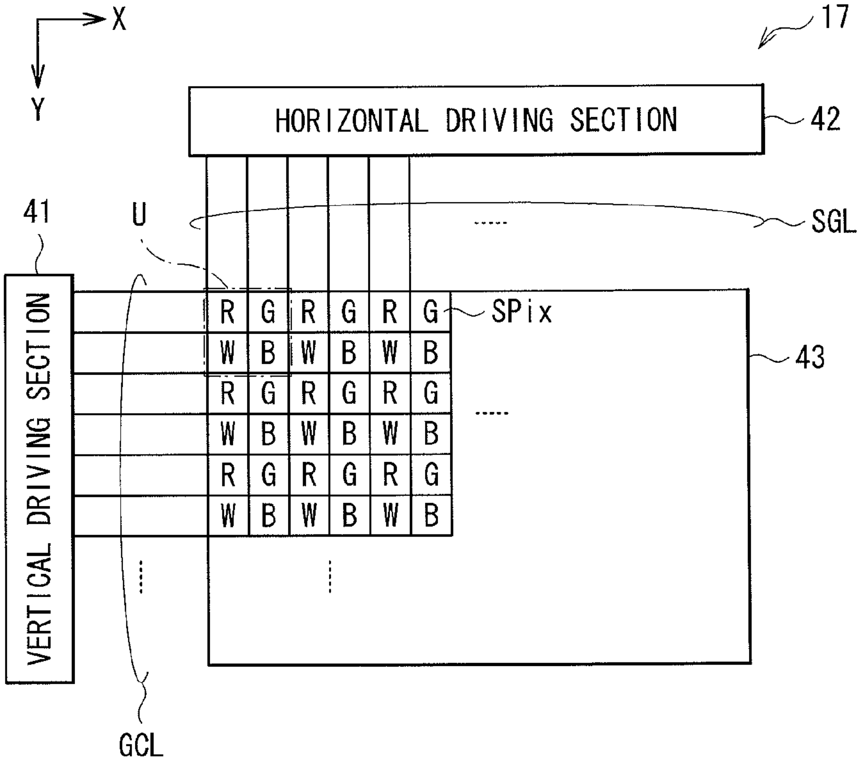
FIG. 5 is a block diagram illustrating a configuration example of an EL display section illustrated in FIG. 1.

FIG. 5 illustrates a configuration example of the EL display section 17. The EL display section 17 includes a pixel array section 43, a vertical driving section 41, and a horizontal driving section 42.

The pixel array section 43 has a resolution of so-called 2k1k in this example, and four subpixels SPix forming each pixel are arranged in a matrix. In this example, red, green, blue, and white subpixels SPix are used as the four subpixels SPix. In the pixel array section 43, these four subpixels SPix are arranged and repeated as a unit forming a configurational unit U. In this example, these four subpixels SPix are arranged in two rows and two columns in the configurational unit U. Specifically, in FIG. 5, the red (R) subpixel SPix is arranged to be at upper left, the green (G) subpixel SPix is arranged to be at upper right, the white (W) subpixel SPix is arranged to be at lower left, and the blue (B) subpixel SPix is arranged to be at lower right.

It is to be noted that the colors of the four subpixels SPix are not limited to these colors. For example, a subpixel SPix of other color having high luminosity factor similar to that of white may be used in place of the white subpixel SPix. To be more specific, a subpixel SPix of a color having luminosity factor equivalent to or higher than that of green, which has the highest luminosity factor among red, blue, and green, is desirably used.

The horizontal driving section 41 generates a scanning signal based on timing control performed by the display control section 16, and supplies the generated scanning signal to the pixel array section 43 through a gate line GCL to select the subpixels SPix in the pixel array section 43 row by row (every subpixel line), thereby performing line-sequential scanning. The horizontal driving section 42 generates a pixel signal based on the timing control performed by the display control section 16, and supplies the generated pixel signal to the pixel array section 43 through a data line SGL, thereby supplying the pixel signal to each of the subpixels SPix in the pixel array section 43.

When controlling the above-described EL display section 17 based on the images F4 and Fi4 included in the image signal Sp4, the display control section 16 controls the EL display section 17 according to the discrimination signal SD, so as to perform display driving that differs between the images F4 and Fi4.

Figure 6A:
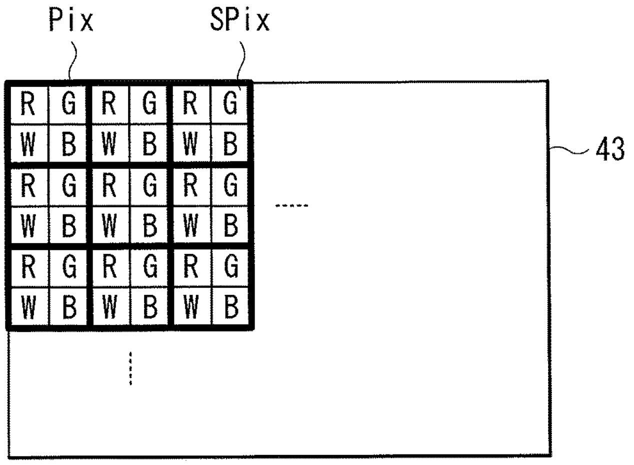
FIGS. 6A and 6B are schematic diagrams illustrating an operation example of a display control section illustrated in FIG. 1.
Figure 6B:
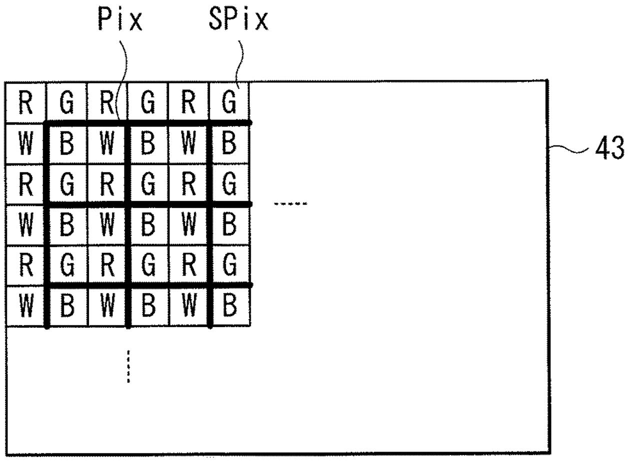

FIGS. 6A and 6B schematically illustrate control operation of the display control section 16. FIG. 6A illustrates a case in which the image F4 is displayed, and FIG. 6B illustrates a case in which the image Fi4 is displayed. First, the display control section 16 determines whether the image supplied by the image signal Sp4 is the image F4 or the image Fi4, based on the discrimination signal SD. When it is determined that the image F4 is supplied, the display control section 16 performs the control so that the four subpixels SPix of the configurational unit U (FIG. 5) form a pixel Pix as illustrated in FIG. 6A. In other words, in this case, in the pixel Pix, the red (R) subpixel SPix is arranged to be at upper left, the green (G) subpixel SPix is arranged to be at upper right, the white (W) subpixel SPix is arranged to be at lower left, and the blue (B) subpixel SPix is arranged to be at lower right. When it is determined that the image Fi4 is supplied, the display control section 16 performs the control so that the four subpixels SPix each displaced by one subpixel in each of the horizontal direction X and the vertical direction Y form a pixel Pix as illustrated in FIG. 6B. In other words, in this case, in the pixel Pix, the blue (B) subpixel SPix is arranged to be at upper left, the white (W) subpixel SPix is arranged to be at upper right, the green (G) subpixel SPix is arranged to be at lower left, and the red (R) subpixel SPix is arranged to be at lower right.

In this way, the display control section 16 performs the control so that each of the pixel Pix in displaying the image F4 and the pixel Pix in displaying the image Fi4 is displaced in the horizontal direction X and the vertical direction Y. As a result, in the display 1, resolutions in the horizontal direction X and the vertical direction Y are improved, as will be described later.

Here, the display control section 16 corresponds to a specific but not limitative example of "display driving section" in the disclosure. The frame-rate conversion section 12, the filter 13, and the image separation section 14 combined correspond to a specific but not limitative example of "image generation section" in the disclosure. The images F3 and F4 correspond to a specific but not limitative example of "first image data set" in the disclosure, and the images Fi3 and Fi4 correspond to a specific but not limitative example of "second image data set" in the disclosure. The images F and F2 correspond to a specific but not limitative example of "third image data set" in the disclosure, and the images Fi and Fi2 correspond to a specific but not limitative example of "fourth image data set" in the disclosure.

[Operation and Functions]

Next, operation and functions of the display 1 in the first embodiment will be described.

(Summary of Overall Operation)

First, a summary of overall operation of the display 1 will be described with reference to FIG. 1. The input section 11 generates the image signal Sp0 based on the image signal supplied from the external equipment. The frame-rate conversion section 12 performs the frame rate conversion based on the image signal Sp0, and generates the image signal Sp1 in which the frame image F and the frame image Fi are alternately arranged. The filter 13 smooths luminance information on the frame images F and Fi to generate the frame images F2 and Fi2, respectively. The image separation section 14 separates the image F3 and the image F13 from the frame image F2 and the frame image Fi2, respectively, and also generates the discrimination signal SD. The image processing section 15 performs the predetermined image processing on the images F3 and Fi3 to generate the images F4 and Fi4. The display control section 16 controls the display operation in the EL display section 17, based on the images F4 and Fi4 as well as the discrimination signal SD. The EL display section 17 performs the display operation based on the control by the display control section 16.

(Detailed Operation)

Figure 7:
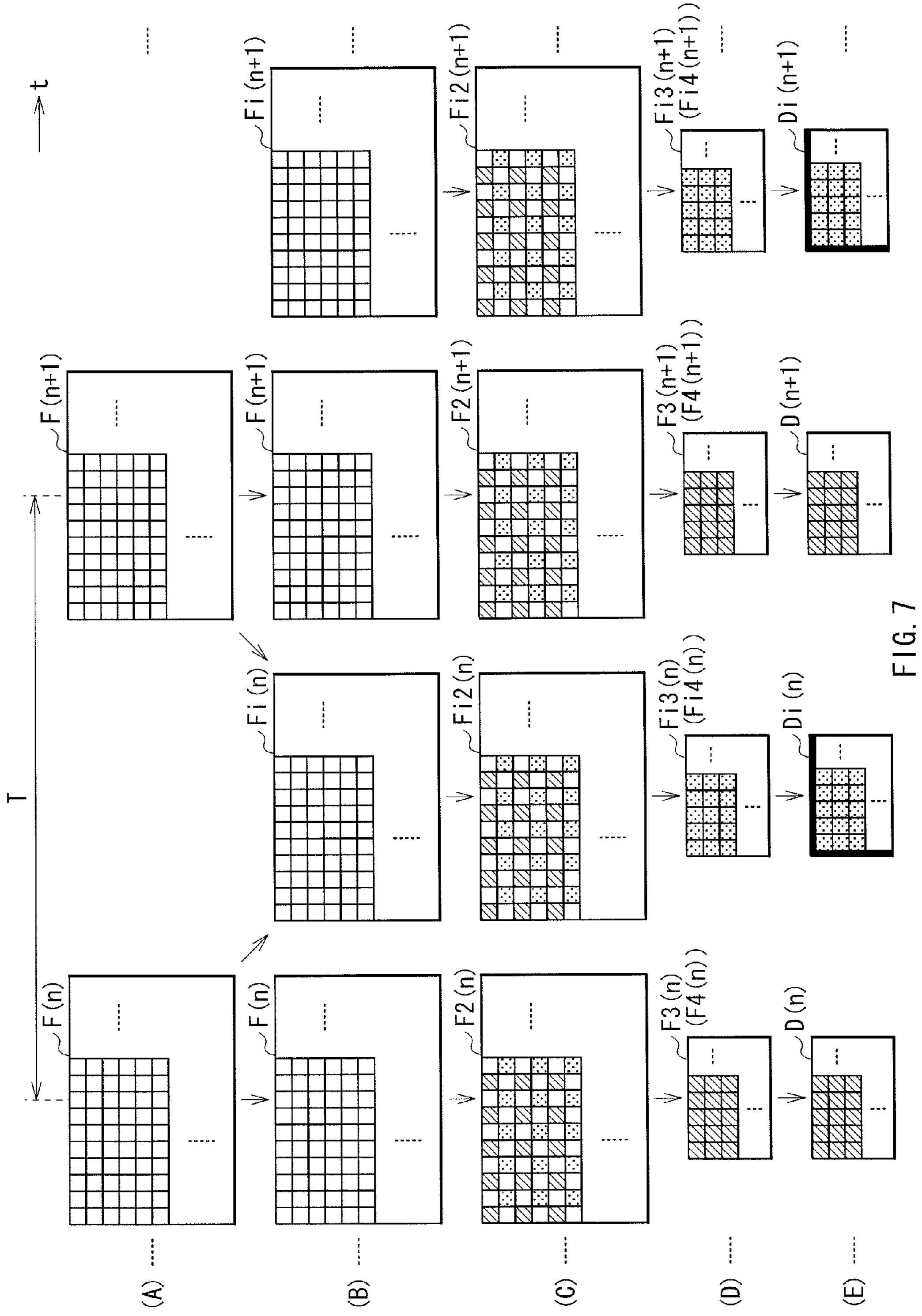
FIG. 7 is a schematic diagram illustrating an operation example of the display illustrated in FIG. 1.

FIG. 7 schematically illustrates detailed operation of the display 1. Part (A) of FIG. 7 illustrates the frame image F included in the image signal Sp0, and Part (B) of FIG. 7 illustrates the frame images F and Fi included in the image signal Sp1. Part (C) of FIG. 7 illustrates the frame images F2 and Fi2 included in the image signal Sp2, and Part (D) of FIG. 7 illustrates the images F3 and Fi3 included in the image signal Sp3. Part (E) of FIG. 7 illustrates display images D and Di in the EL display section 17. Here, for instance, F(n) represents the nth frame image F, and F(n+1) represents the (n+1)th frame image F supplied subsequent to the frame image F(n). Further, the frame image F is supplied at an interval T (e.g. 16.7 [msec]=1/60 [Hz]).

First, the frame-rate conversion section 12 doubles the frame rate of the image signal Sp0 as illustrated in Part (B) of FIG. 7. Specifically, for example, the frame-rate conversion section 12 generates the frame image Fi(n) by performing interpolation processing, based on the frame images F(n) and F(n+1) (Part (A) of FIG. 7) that are included in the image signal Sp0 and are next to each other on the time axis (Part (B) of FIG. 7). The frame-rate conversion section 12 then inserts the frame image Fi(n) between the frame images F(n) and F(n+1).

Next, for instance, the filter 13 generates the frame images F2 and Fi2 by smoothing luminance information on the frame images F and Fi, respectively, as illustrated in Part (C) of FIG. 7. Specifically, for example, the filter 13 generates the frame image F2(*n*) by smoothing the frame image F(n) (Part (B) of FIG. 7), and generate the frame image Fi2(*n*) by smoothing the frame image Fi(n) (Part (B) of FIG. 7).

Subsequently, as illustrated in Part (D) of FIG. 7, the image separation section 14 generates the image F3 based on the frame image F2, and also generates the image Fi3 based on the frame image Fi2. Specifically, for example, the image separation section 14 separates pieces of luminance information I on coordinates that are odd numbers in both of the horizontal direction X and the vertical direction Y, from the frame image F2(*n*) (Part (C) of FIG. 7), thereby generating the image F3(*n*) formed of these pieces of luminance information I. Similarly, for example, the image separation section 14 separates pieces of luminance information I on coordinates that are even numbers in both of the horizontal direction X and the vertical direction Y, from the frame image Fi2(*n*) (Part (C) of FIG. 7), thereby generating the image Fi3(*n*) formed of these pieces of luminance information I.

Next, the image processing section 15 performs the predetermined image processing on the frame images F3 and Fi3 to generate the frame images F4 and Fi4, respectively (Part (D) of FIG. 7).

Subsequently, the display control section 16 controls the display operation in the EL display section 17, based on the frame images F4 and Fi4 as well as the discrimination signal SD, as illustrated in Part (E) of FIG. 7. Specifically, for instance, the display control section 16 performs control based on the discrimination signal SD so that the pixel Pix has a configuration illustrated in FIG. 6A, and the EL display section 17 displays a display image D(n) (Part (E) of FIG. 7) based on the image F4(*n*) (Part (D) of FIG. 7). Similarly, for instance, the display control section 16 performs control based on the discrimination signal SD so that the pixel Pix has a configuration illustrated in FIG. 6B, and the EL display section 17 displays a display image Di(n) (Part (E) of FIG. 7) based on the image Fi4(*n*) (Part (D) of FIG. 7).

In this way, in the display 1, the display driving is performed based on the pieces of luminance information I on the coordinates that are odd numbers in both of the horizontal direction X and the vertical direction Y in the frame image F, and thus the display image D is displayed. At the same time, based on the pieces of luminance information I on the coordinates that are even numbers in both of the horizontal direction X and the vertical direction Y in the frame image Fi generated by the interpolation processing, the display driving is performed so as to displace the subpixels SPix by one in each of the horizontal direction X and the vertical direction Y, and thus the display image Di is displayed. The display image D and the display image Di are alternately displayed. Thus, the viewer views a mean image of the display images D and Di.

Figure 8A:
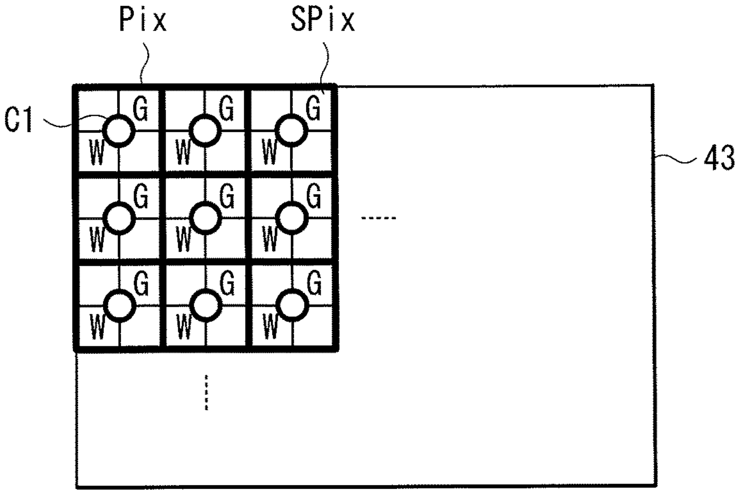
FIGS. 8A to 8C are explanatory diagrams illustrating a characteristic example of the display illustrated in FIG. 1.
Figure 8B:
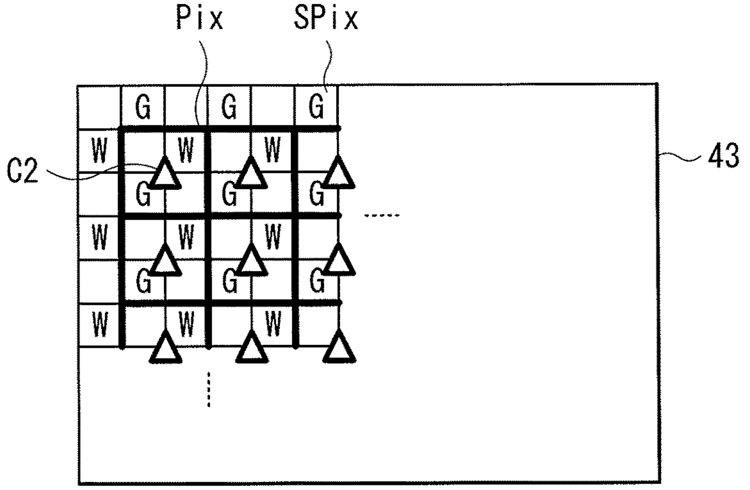
Figure 8C:
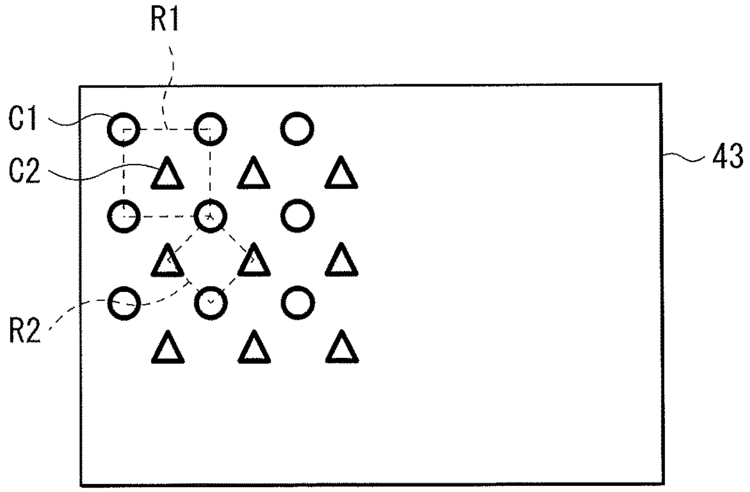

FIGS. 8A to 8C each illustrate a resolution of the display 1. FIG. 8A illustrates the resolution of the display image D, FIG. 8B illustrates the resolution of the display image Di, and FIG. 8C illustrates the resolution of the mean image of the display images D and Di.

Among the colors of the four subpixels SPix forming each of the pixels Pix, green and white provide higher luminosity factor for humans than those of the remaining two colors. Therefore, the position of a luminance centroid in the pixel Pix is determined mainly by the position of the green (G) subpixel SPix and the position of the white (W) subpixel SPix. In other words, when the display 1 displays the display image D, the green (G) subpixel SPix is arranged to be at upper right and the white (W) subpixel SPix is arranged to be at lower left in the pixel Pix, and therefore, the position of the luminance centroid (Cl) is substantially at the center of the pixel Pix or in the vicinity thereof, as illustrated in FIG. 8A. This luminance centroid is located with the same pitch as that of the pixel Pix in each of the horizontal direction X and the vertical direction Y.

Similarly, when the display 1 displays the display image Di, the white (W) subpixel SPix is arranged to be at upper right and the green (G) subpixel SPix is arranged to be at lower left in the pixel Pix, and therefore, the position of the luminance centroid (C2) is substantially at the center of the pixel Pix or in the vicinity thereof, as illustrated in FIG. 8B.

This luminance centroid is located with the same pitch as that of the pixel Pix in each of the horizontal direction X and the vertical direction Y.

As illustrated in FIGS. 6A and 6B, the display control section 16 allows the pixel Pix in displaying the display image Di (FIG. 6B) to be displaced from the pixel Pix in displaying the display image D (FIG. 6A) by one subpixel in each of the horizontal direction X and the vertical direction Y. Therefore, when the display image D and the display image Di are alternately displayed, the luminance centroids C1 and C2 are displaced from each other by one subpixel in each of the horizontal direction X and the vertical direction Y, as illustrated in FIG. 8C. That is to say, for example, the resolution in each of the horizontal direction X and the vertical direction Y is improved to be twice as high as that in a case of displaying only the display image D repeatedly. In other words, the resolution is improved by 1.41 times (the square root of 2), based on an area ratio between a region R1 corresponding to each of luminance centroids in displaying only the display image D repeatedly and a region R2 corresponding to each of the luminance centroids in displaying the display images D and Di alternately.

In this way, in the display 1, the control is performed to cause a displacement of the pixel Pix between when the display image D is displayed and when the display image Di is displayed. Therefore, a resolution higher than the resolution of the EL display section 17 is achievable.

In particular, in the pixel array section 43, the green subpixel SPix and the white subpixel SPix are arranged to avoid being next to each other in the horizontal direction X and the vertical direction Y. Therefore, the luminance centroid is allowed to be substantially at the center of the pixel Pix, and also the luminance centroid C2 is allowed to be substantially at the middle of the four luminance centroids Cl adjacent to one another or in the vicinity thereof as illustrated in FIG. 8C. Thus, an increase in image quality is achievable.

When, for instance, a high-definition display section is used as the EL display section 17, a high resolution is achievable without thus controlling the displacement of the pixel Pix. In this case, however, each horizontal period in line-sequential scanning may be reduced, making it difficult to secure a sufficient length of horizontal period, and therefore, image quality may decline. In the display 1, in contrast, since the resolution is improved by shifting the pixel Pix, it is not necessary to use a high-definition EL display section, and therefore, a horizontal period is allowed to be increased, which reduces a likelihood of a decline in image quality.

In addition, in the display 1, the image separation section 14 generates the image signal Sp3 having the resolution of 2k1k, based on the image signal Sp2 having the resolution of 4k2k, and the image processing section 15 performs the predetermined image processing on the image signal Sp3. Therefore, a burden on image processing in the image processing section 15 is allowed to be reduced.

(Operation of Filter 13)

Next, operation of the filter 13 will be described. The filter 13 smooths the luminance information I on each pixel in the frame images F and Fi. As will be described below, this allows deterioration of image quality to be reduced, when a spatial frequency of the luminance information I in the vertical direction is high, for example.

Figure 9A:
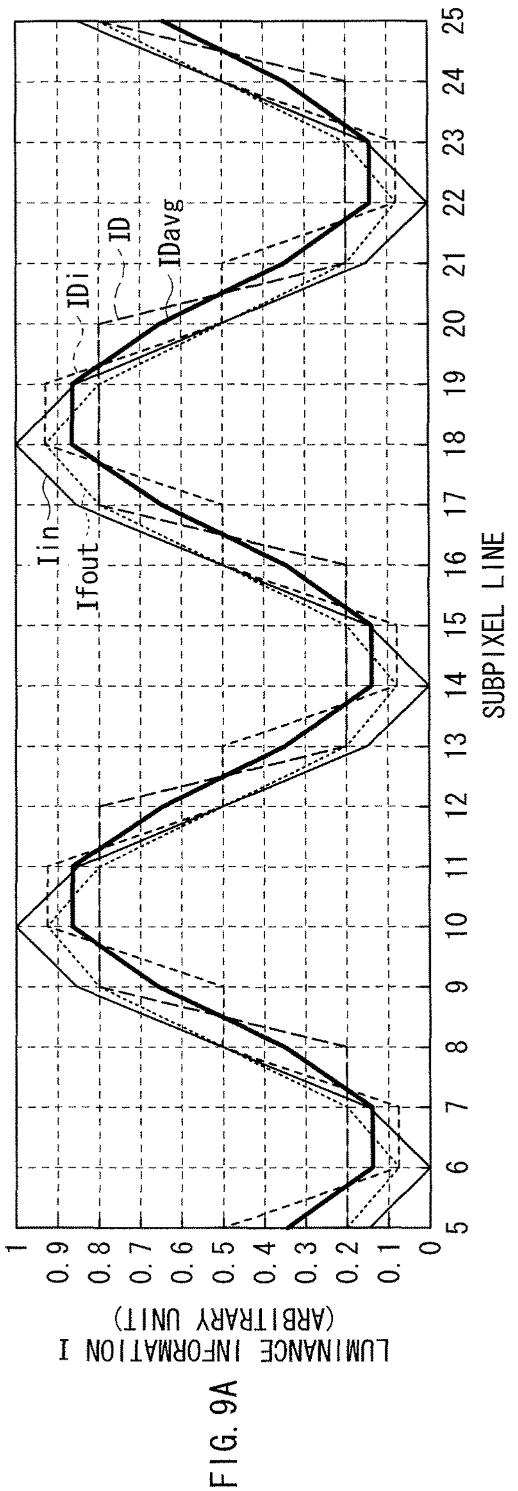
FIGS. 9A and 9B are explanatory diagrams illustrating another characteristic example of the display illustrated in FIG. 1.
Figure 9B:
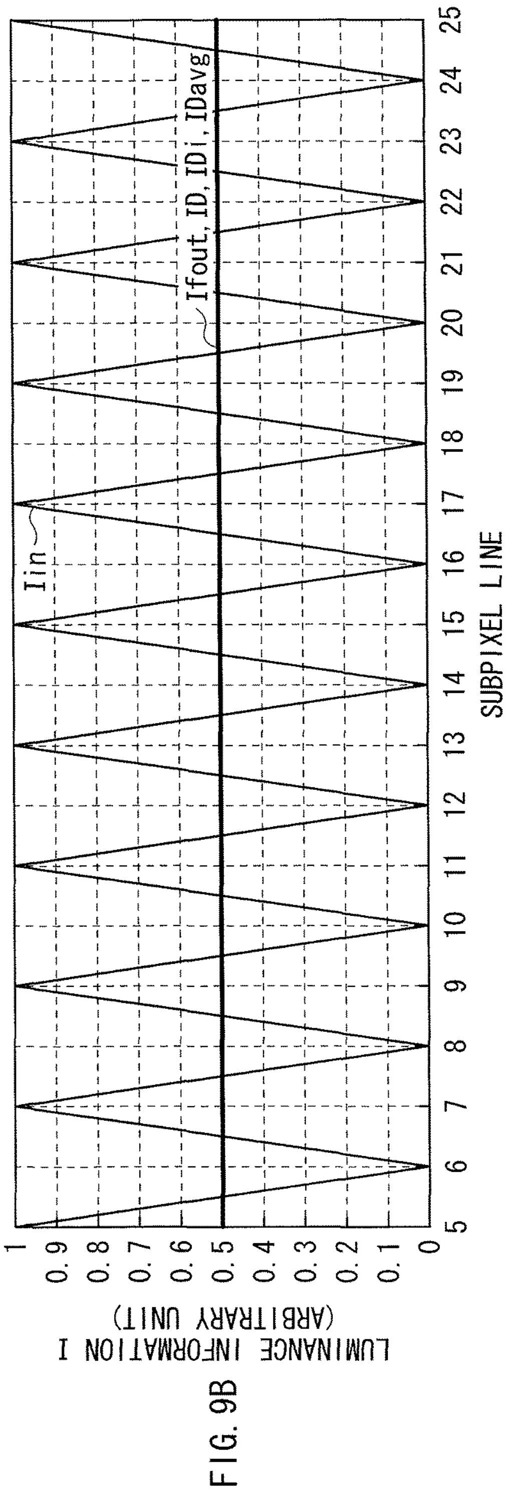

FIGS. 9A and 9B illustrate operation of the display 1 in a case of handling a still image. In this example, there are illustrated: luminance information (filter output luminance Ifout) in output of the filter 13, luminance information (display luminance ID) in the display image D, luminance information (display luminance IDi) in the display image Di, and an average value of the display luminances ID and IDi (i.e. display luminance IDavg), when luminance information (input luminance Iin) that changes in a certain cycle with respect to a vertical direction is inputted into the filter 13. FIG. 9A illustrates a case in which the input luminance Iin changes in a cycle of eight subpixels in the vertical direction (by eight subpixel lines). FIG. 9B illustrates a case in which the input luminance Iin changes in a cycle of two subpixels in the vertical direction (by two subpixel lines). In other words, FIG. 9B illustrates a case in which a spatial frequency of the luminance information in the vertical direction is high. Further, in this example, the filter coefficients illustrated in FIG. 3B are used as filter coefficients of the filter 13. It is to be noted that, in this example, only the operation for the luminance information changing in a certain cycle in the vertical direction is described, but the description also applies to operation for luminance information changing in a certain cycle in a horizontal direction.

First, a case in which the spatial frequency is not so high (FIG. 9A) will be described. The filter 13 generates the filter output luminance Ifout by smoothing the input luminance Iin. Then, of the filter output luminance Ifout, luminance information I on coordinates in an odd-numbered subpixel line is displayed in the pixel Pix straddling the subpixel line (an odd-numbered line) and the next subpixel line (an even-numbered line) (the display luminance ID). Similarly, of the filter output luminance Ifout, luminance information I on coordinates in an even-numbered subpixel line is displayed in the pixel Pix straddling the subpixel line (an even-numbered line) and the next subpixel line (an odd-numbered line) (the display luminance IDi). A viewer views a mean value (the average display luminance IDavg) of the display luminance ID and the display luminance IDi.

The average display luminance IDavg takes a shape closer to that of the input luminance Iin than the display luminances ID and IDi, which allows degradation of image quality to be suppressed. In other words, in the display 1, the display image D and the display image Di are alternately displayed as illustrated in FIG. 7, but, for example, when only the display image D is displayed or when only the display image Di is displayed, image quality may decline. Specifically, the viewer views the display luminance ID (FIG. 9A) when only the display image D is displayed, and views the display luminance IDi (FIG. 9A) when only the display image Di is displayed. In this case, the display luminances ID and IDi take shapes different from the shape of the input luminance Iin and thus, image quality may decline. However, in the display 1, since the display image D and the display image Di having the pixels Pix displaced with respect to each other are alternately displayed, an increase in resolution is allowed, making it possible to improve the image quality.

Next, a case in which the spatial frequency is high (FIG. 9B) will be described. In this case, the filter 13 smooths the input luminance Iin, thereby generating the filter output luminance Ifout that is substantially uniform. Therefore, the display luminances ID and IDi as well as the average display luminance IDavg are also substantially uniform.

In this case, the average display luminance IDavg takes a shape that is different from that of the input luminance Iin to a great extent. However, in general, the resolving power of humans in terms of sight is not sufficiently high, and thus, it is difficult for a viewer to view the luminance information I of such a high spatial frequency, and the viewer views an average luminance of a plurality of subpixel lines. Therefore, substantially no issue arises.

In addition, in the case in which the spatial frequency is thus high, a likelihood that flicker may occur is allowed to be reduced by providing the filter 13. This will be described below by making a comparison with a comparative example.

(Comparative Example)

Now, functions of the first embodiment will be described by making a comparison with a comparative example. A display 1R according to the comparative example does not include the filter 13. The display 1R is otherwise similar to the first embodiment (FIG. 1) in terms of configuration.

Figure 10A:
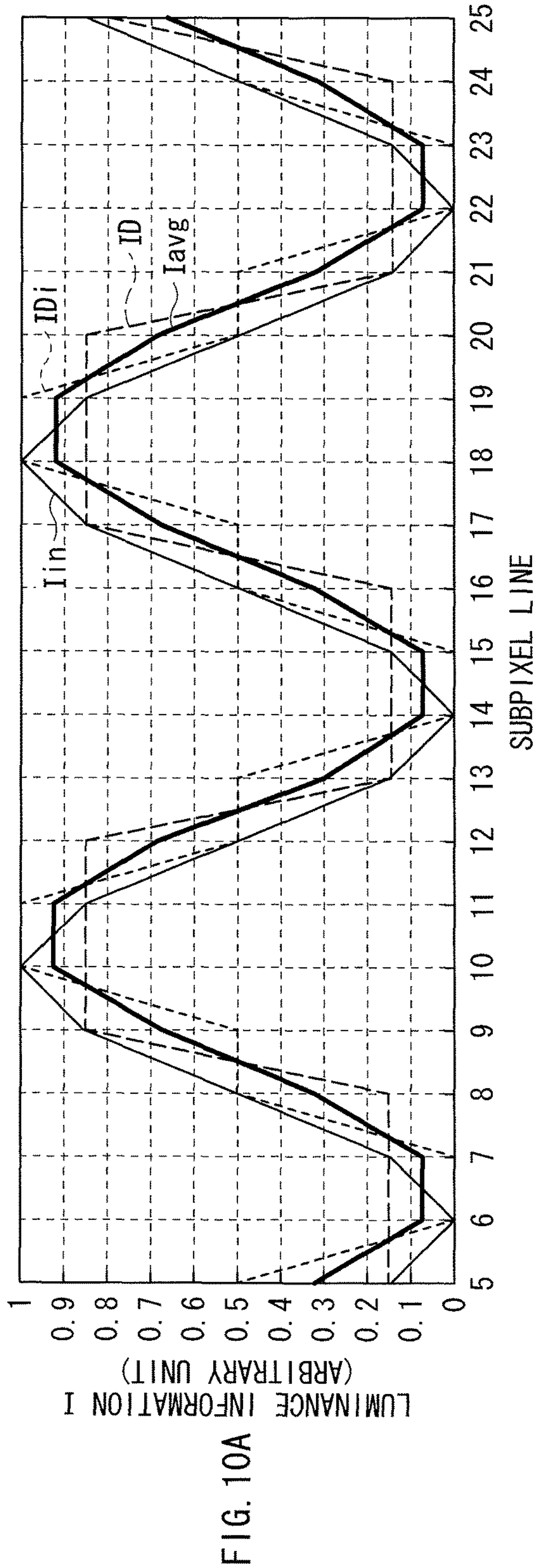
FIGS. 10A and 10B are explanatory diagrams illustrating a characteristic example of a display according to a comparative example of the first embodiment.
Figure 10B:
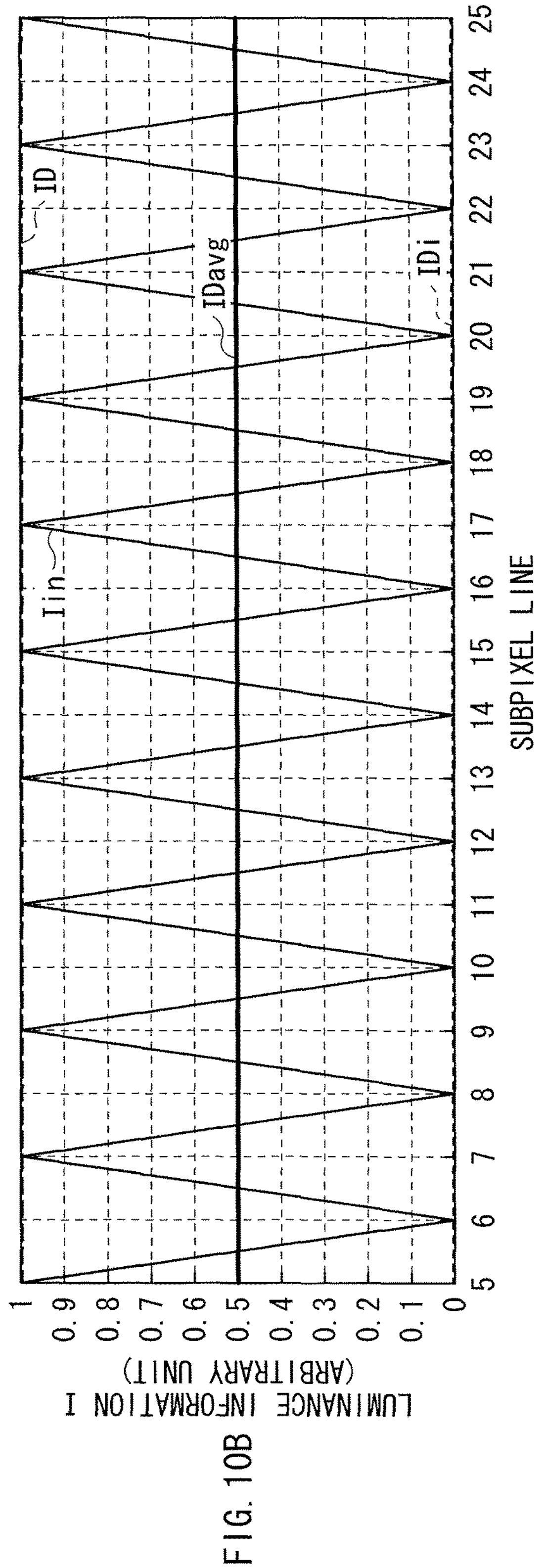

FIGS. 10A and 10B illustrate operation of the display 1R. FIG. 10A illustrates a case in which an input luminance Iin changes in a cycle of eight subpixel lines, and FIG. 10B illustrates a case in which the input luminance Iin changes in a cycle of two subpixel lines. In other words, FIGS. 10A and 10B correspond to FIGS. 9A and 9B (for the display 1 according to the first embodiment), respectively.

In a case in which a spatial frequency is not so high (FIG. 10A), average display luminance IDavg is allowed to take a shape closer to that of the input luminance Iin in a manner similar to the display 1 (FIG. 9A) and thus, image quality is allowed to be enhanced.

In a case in which the spatial frequency is high (FIG. 10B), flicker is likely to occur, which may reduce the image quality. In other words, in this example, display luminance ID is uniform at luminance information I in an odd-numbered subpixel line, of the input luminance Iin, and display luminance IDi is uniform at luminance information I on coordinates in an even-numbered subpixel line, of the input luminance Iin. Therefore, for example, when a frame image F is made up of strips in which a pixel line of white and a pixel line of black are alternately arranged, the display image D of fully white and the display image Di of fully black is alternately displayed in a cycle of 60 [Hz] and thus, a viewer may perceive flicker.

In contrast, in the display 1 according to the first embodiment, since the filter 13 is provided, the luminance information is smoothed when the spatial frequency is high and thus, a likelihood that such flicker may occur is allowed to be reduced.

In the first embodiment, the case in which the input luminance Iin changes in the cycle of two subpixel lines has been taken as an example of the case in which the spatial frequency is high. However, in a case in which only an image having a lower spatial frequency is handled, an effect of the smoothing may be reduced by setting a lager value (e.g. 6) as the central value of the filter coefficients (FIG. 3B) in three rows and three columns in the filter 13. In this case, for example, in FIG. 9A, the average display luminance IDavg is made closer to the input luminance Iin and thus, image quality is allowed to be enhanced.

Further, in the display 1 according to the first embodiment, among the filter coefficients in three rows and three columns of the filter 13, the filter coefficient in each of the four corners is set at “0”. This allows sufficient smoothing in a vertical direction and a lateral direction in which pixel spacing is narrow, and also allows the effect of the smoothing to be reduced in oblique directions in which pixel spacing is slightly wide.

[Effects]

As described above, in the first embodiment, two images in which the pixels of one of these images are displaced with respect to those of the other in the horizontal direction and the vertical direction are alternately displayed. Therefore, the resolution is allowed to be increased and thus the image quality is allowed to be enhanced. In the first embodiment, in particular, since the green subpixel and the white subpixel are arranged to avoid being next to each other in the horizontal direction and the vertical direction, the image quality is allowed to be enhanced.

In addition, in the first embodiment, the image separation section generates the image having resolutions which are low in the horizontal direction and the vertical direction, and the image processing section performs the predetermined image processing on the image having the low resolutions. Therefore, the burden on the image processing in the image processing section is allowed to be reduced.

Moreover, in the first embodiment, since the filter is provided, a likelihood that flicker may occur is allowed to be reduced, and thus a decline in the image quality is allowed to be suppressed.

[Modification 1-1]

Figure 11:
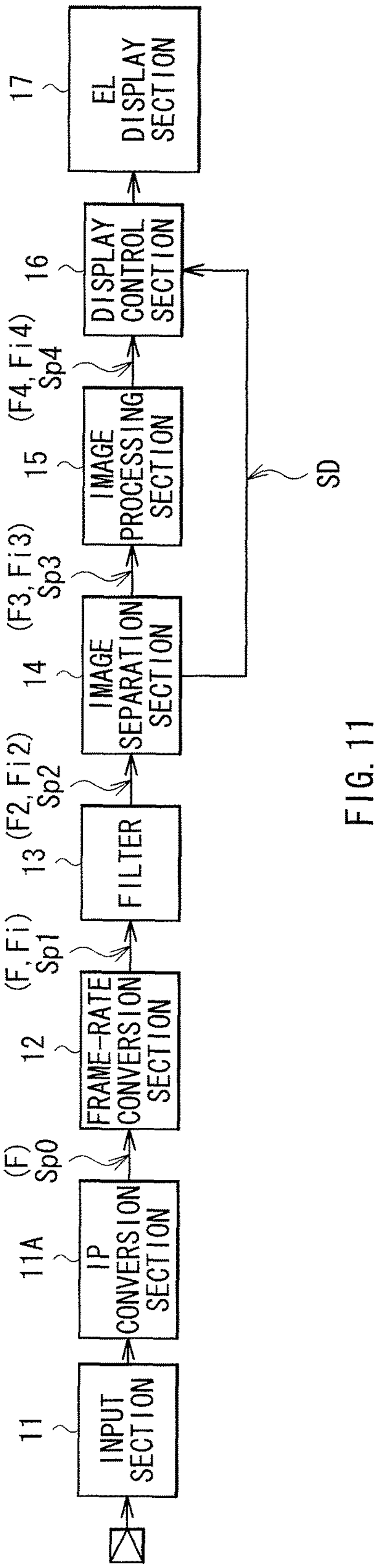
FIG. 11 is a block diagram illustrating a configuration example of a display according to a modification of the first embodiment.

In the above-described first embodiment, the image signal supplied to the display 1 is a progressive signal, but is not limited thereto. Alternatively, for instance, an interlaced signal may be used by providing an IP (Interlace/Progressive) conversion section 11A as illustrated in FIG. 11.

[Modification 1-2]

Figure 12:
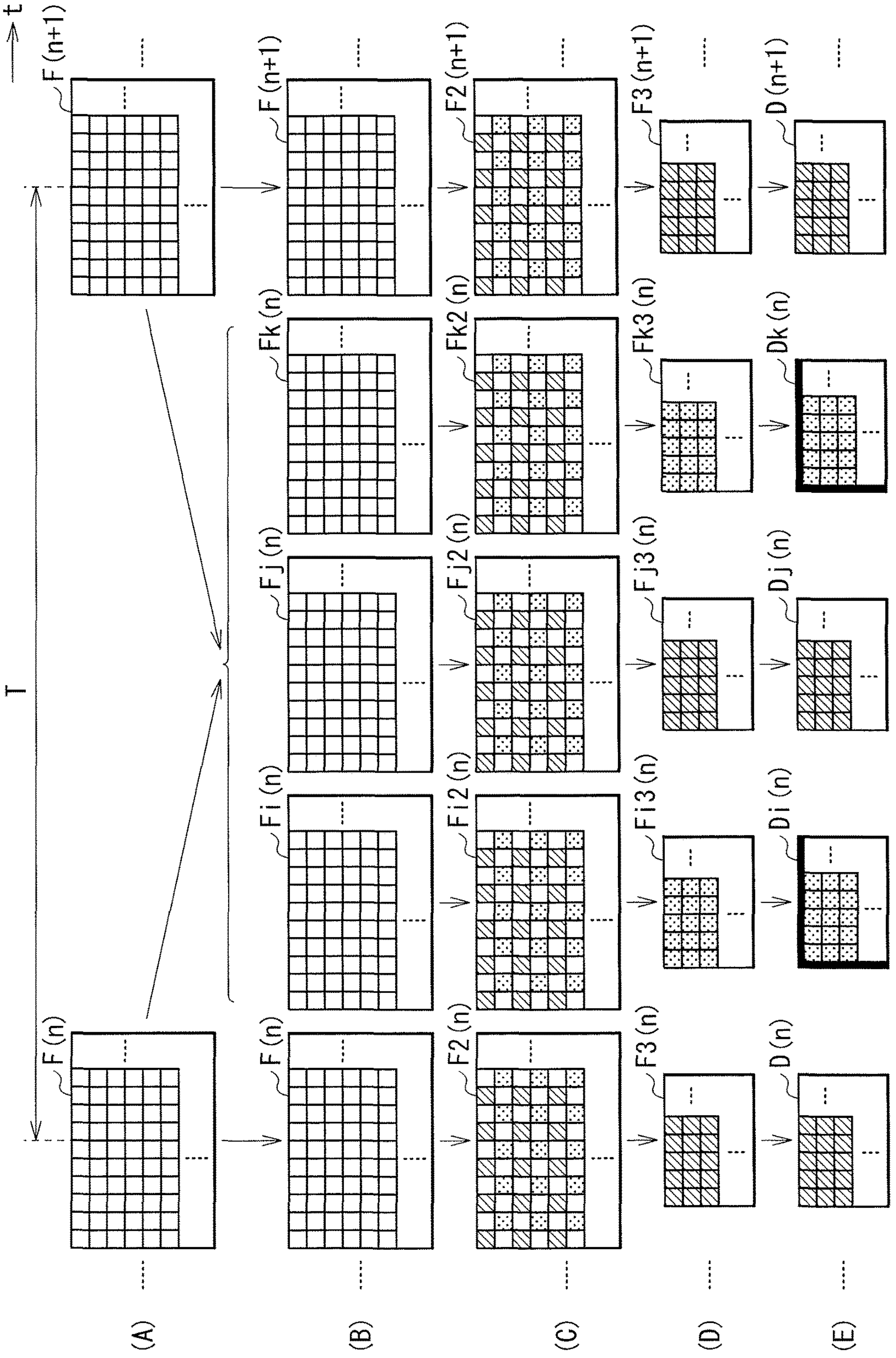
FIG. 12 is a schematic diagram illustrating an operation example of a display according to another modification of the first embodiment.

In the above-described first embodiment, the frame-rate conversion section 12 doubles the frame rate, but is not limited thereto. Alternatively, the frame rate may be converted to be four-fold as illustrated in FIG. 12, for example. In the present modification, the frame rate conversion is performed by generating three frame images Fi, Fj, and Fk through interpolation processing, based on the frame images F next to each other on the time axis, and then by inserting the frame images Fi, Fj, and Fk between these frame images F.

(2. Second Embodiment)

Next, a display 2 according to a second embodiment will be described. In the second embodiment, a circuit configuration is simplified by providing a signal having the same resolution as that of an EL display section 17 as the supplied image signal. It is to be noted that the same elements that are substantially the same as those of the display 1 according to the first embodiment will be provided with the same reference numerals as those of the first embodiment, and the description thereof will be omitted as appropriate.

Figure 13:
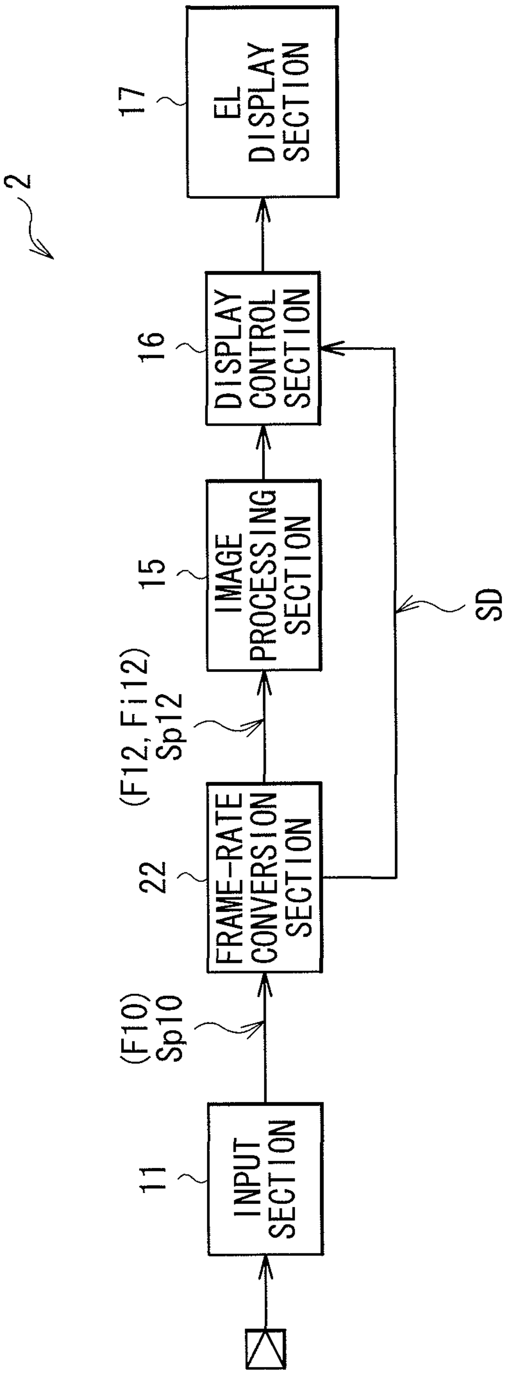
FIG. 13 is a block diagram illustrating a configuration example of a display according to a second embodiment.

FIG. 13 illustrates a configuration example of the display 2 according to the second embodiment. An image signal supplied to the display 2 has a resolution of so-called 2k1k. In other words, the resolution of the image signal is the same resolution as that of the EL display section 17. The display 2 includes a frame-rate conversion section 22. The frame-rate conversion section 22 generates an image signal Sp12 (images F12 and Fi12) by performing frame rate conversion, based on a supplied image signal Sp10 (a frame image F10). Specifically, as will be described later, the frame-rate conversion section 22 generates an image F11 for each of the frame images F10 by performing interpolation processing between pixels. Then, based on the images F11 next to each other on the time axis, the frame-rate conversion section 22 generates and outputs the image Fi12 by performing interpolation processing on the time axis, and outputs the frame image F10 as the image F12.

Figure 14:
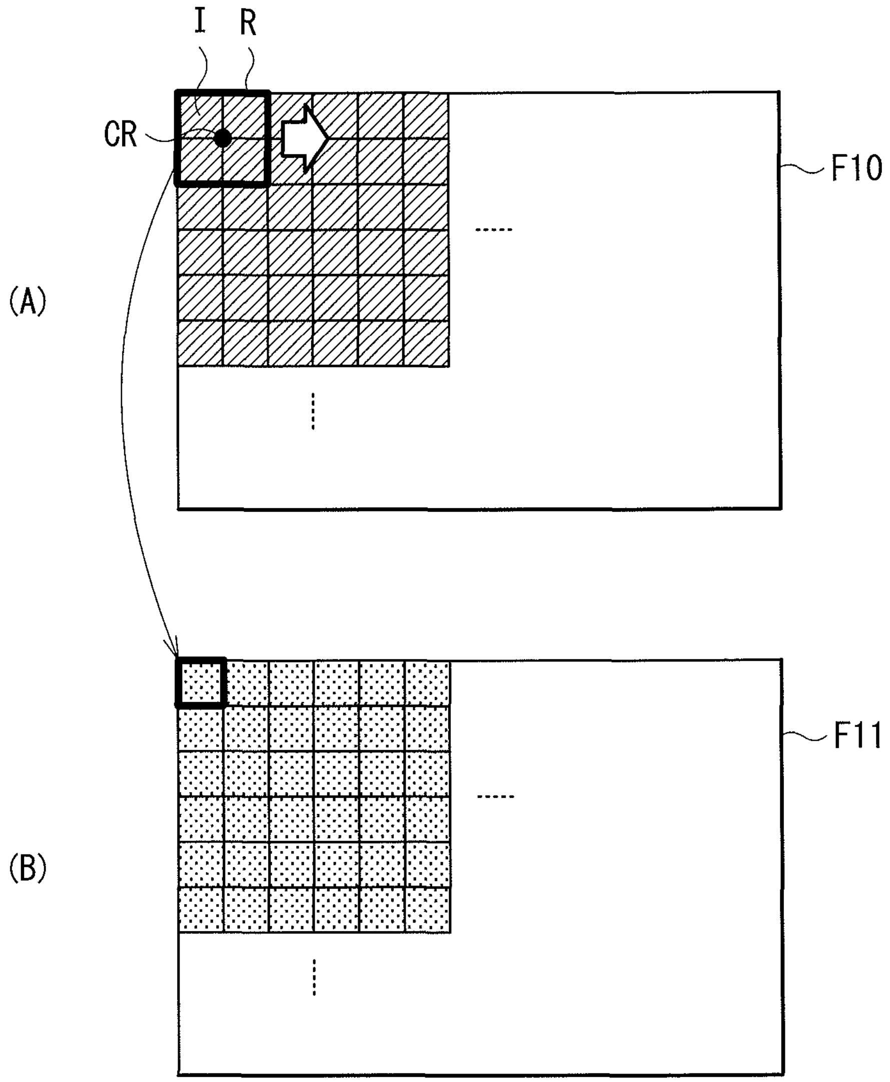
FIG. 14 is a schematic diagram illustrating an operation example of a frame-rate conversion section 22 illustrated in FIG. 13.

FIG. 14 schematically illustrates the interpolation processing between pixels in the frame-rate conversion section 22. Part (A) of FIG. 14 illustrates the frame image F10, and Part (B) of FIG. 14 illustrates the image F11 generated by the interpolation processing between pixels. Based on luminance information I in a region R of two rows and two columns in the frame image F10, the frame-rate conversion section 22 determines luminance information I in a center CR of the region R by performing the interpolation processing. The frame-rate conversion section 22 performs similar operation, while shifting the region R pixel by pixel in a horizontal direction X or a vertical direction Y in the frame image F10. In this way, the frame-rate conversion section 22 performs the interpolation processing between pixels for the entire frame image F10, thereby generating the image F11.

Subsequently, based on the images F11 next to each other on the time axis, the frame-rate conversion section 22 generates the image Fi12 by performing the interpolation processing on the time axis.

Further, this frame-rate conversion section 22 also has a function of generating a discrimination signal SD indicating whether the generated image is the image F12 or the image Fi12 when generating the images F12 and Fi12, as with the image separation section 14 according to the first embodiment.

Here, the frame-rate conversion section 22 corresponds to a specific but not limitative example of "image generation section" in the disclosure. The frame image F10 corresponds to a specific but not limitative example of "input image data set" in the disclosure. The image F11 corresponds to a specific but not limitative example of "interpolation image data set" in the disclosure.

Figure 15:
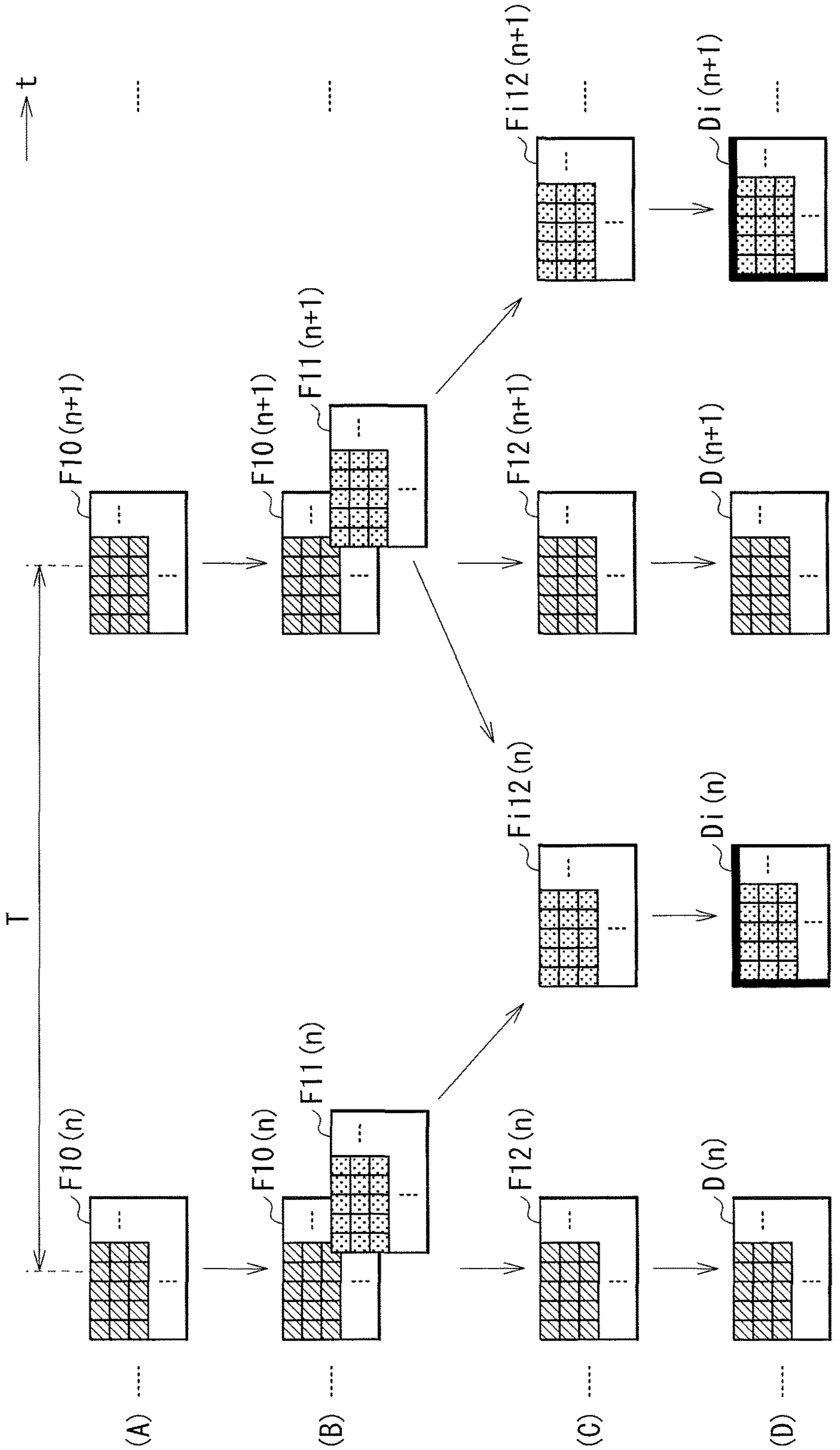
FIG. 15 is a schematic diagram illustrating an operation example of the display illustrated in FIG. 13.

FIG. 15 schematically illustrates detailed operation of the display 2. Part (A) of FIG. 15 illustrates the frame image F10 included in the image signal Sp10, Part (B) of FIG. 15 illustrates the frame image F10 and the image F11 generated in the frame-rate conversion section 22, Part (C) of FIG. 15 illustrates the images F12 and Fi12 included in the image signal Sp12, and Part (D) of FIG. 15 illustrates display images D and Di in the EL display section 17. The frame image F10 is supplied at an interval T (e.g. 16.7 [msec]=1/60 [Hz]).

First, the frame-rate conversion section 22 performs the interpolation processing between pixels in the frame image F10 included in the image signal Sp10, as illustrated in Part (B) of FIG. 15. Specifically, for example, based on the frame image F10(*n*) (Part (A) of FIG. 15) included in the image signal Sp10, the frame-rate conversion section 22 generates the image F11(*n*) (Part (B) of FIG. 15), by performing the interpolation processing illustrated in FIG. 14. Similarly, for example, based on the frame image F10(*n*+1) (Part (A) of FIG. 15) included in the image signal Sp10, the frame-rate conversion section 22 generates the image F11(*n*+1) (Part (B) of FIG. 15), by performing the interpolation processing illustrated in FIG. 14.

Next, as illustrated in Part (C) of FIG. 15, the frame-rate conversion section 22 generates the image Fi12(*n*) by performing the interpolation processing on the time axis, based on the images F11(*n*) and F11(*n*+1) next to each other on the time axis (Part (B) of FIG. 15). The frame-rate conversion section 22 then outputs the images F10(*n*) and F10(*n*+1) as the images F12(*n*) and F12(*n*+1), respectively, and outputs the image Fi12(*n*) by inserting the image Fi12(*n*) between the images F12(*n*) and F12(*n*+1) (Part (c) of FIG. 15).

Subsequently, in a manner similar to the first embodiment, an image processing section 15 performs predetermined image processing on the frame images F12 and Fi12, and a display control section 16 performs control of display operation in the EL display section 17. The EL display section 17 displays the display images D and Di (Part (D) of FIG. 15) based on this control.

In the display 2, the supplied image signal is a signal having the resolution of 2k1k, namely, a signal having the same resolution as that of the EL display section 17. Thus, it is not necessary to provide the filter. In other words, in the display 1 according to the first embodiment, in a case where the filter 13 is not provided, flicker may occur when the spatial frequency is high (FIG. 10B) and thus, it is preferable to provide the filter 13. In the display 2 according to the second embodiment, in contrast, the supplied image signal is a signal having the resolution of 2k1k and thus, the image Fi12 is generated by performing the interpolation processing between pixels on the frame image F10 and further performing the interpolation processing on the time axis. Therefore, a likelihood that such flicker may occur is low. Thus, the filter may be omitted.

Further, omitting the filter makes it possible to simplify the circuit configuration. In particular, for example, in the display 1 according to the first embodiment, in order to reduce the above-described flicker, smoothing the image signal Sp1 having the resolution of 4k2k may be desired. Therefore, it may be necessary to perform the conversion into a signal having the same resolution as that of the EL display section 17, by providing the image separation section 14 in a stage following the filter 13. In the display 2 according to the second embodiment, in contrast, since the filter 13 may be omitted, an image signal having the resolution of 2k1k is allowed to be directly generated in the frame-rate conversion section 22, which makes it possible to simplify the circuit configuration.

In the second embodiment, as described above, since the supplied image signal is a signal having the same resolution as that of the EL display section, the circuit configuration is allowed to be simplified. Other effects of the second embodiment are similar to those of the first embodiment.

(3. Application Example)

Now, an application example of the displays of the embodiments and the modifications will be described below.

Figure 16:
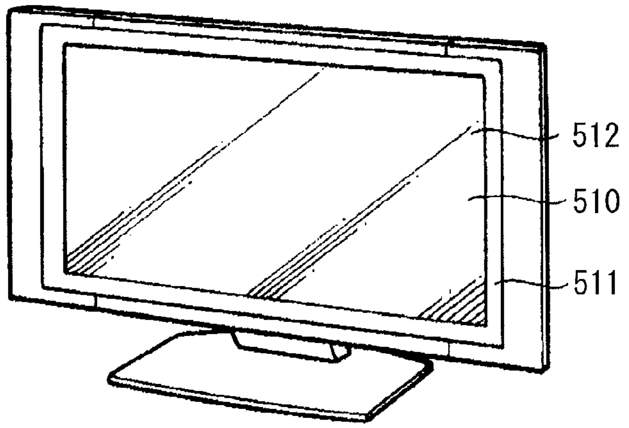
FIG. 16 is a perspective diagram illustrating an appearance configuration of a television receiver to which the display according to any of the embodiments is applied.

FIG. 16 illustrates an appearance of a television receiver to which the display in any of the above-described embodiments and the modifications is applied. The television receiver has, for example, an image-display screen section 510 that includes a front panel 511 and a filter glass 512. The television receiver includes the display according to any of the above-described embodiments and the modifications.

The display according to any of the above-described embodiments and the modifications is applicable to electronic apparatuses in all fields, which display images. The electronic units include, for example, television receivers, digital cameras, laptop computers, portable terminals such as portable telephones, portable game consoles, video cameras, and the like.

The technology has been described with reference to some embodiments and modifications, as well as application examples to electronic apparatuses, but is not limited thereto and may be variously modified.

For example, in each of the embodiments and the like, the four subpixels SPix are arranged in two rows and two columns in the pixel array section 43 of the EL display section 17 to form the configurational unit U, but the technology is not limited thereto. A display 1B according to another modification will be described below in detail.

Figure 17:
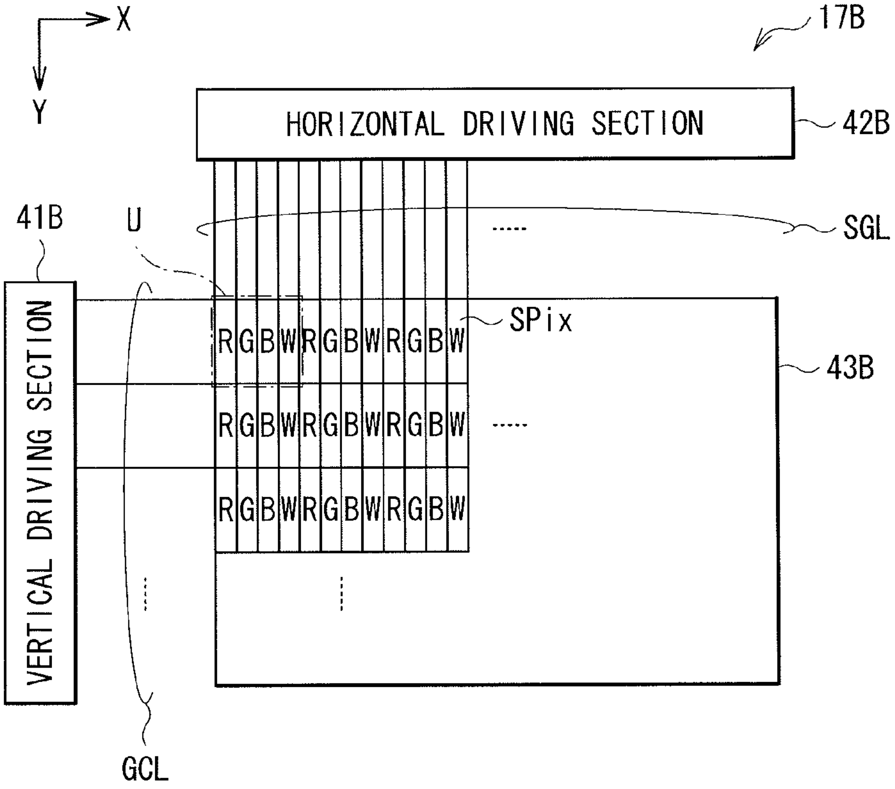
FIG. 17 is a block diagram illustrating a configuration example of an EL display section according to still another modification.

FIG. 17 illustrates a configuration example of an EL display section 17B in the display 1B according to the present modification. The EL display section 17B includes a pixel array section 43B, a vertical driving section 41B, and a horizontal driving section 42B. The pixel array section 43B has a resolution of 2k1k. The vertical driving section 41B and the horizontal driving section 42B drive the pixel array section 43B. In the pixel array section 43B, four subpixels SPix extending in the vertical direction Y are arranged and repeated as a unit forming a configurational unit U. In this example, in the configurational unit U, the four subpixels SPix are arranged side by side in the horizontal direction X. Specifically, in FIG. 17, red (R), green (G), blue (B), and white (W) subpixels SPix are arranged in this order from left.

Figure 18A:
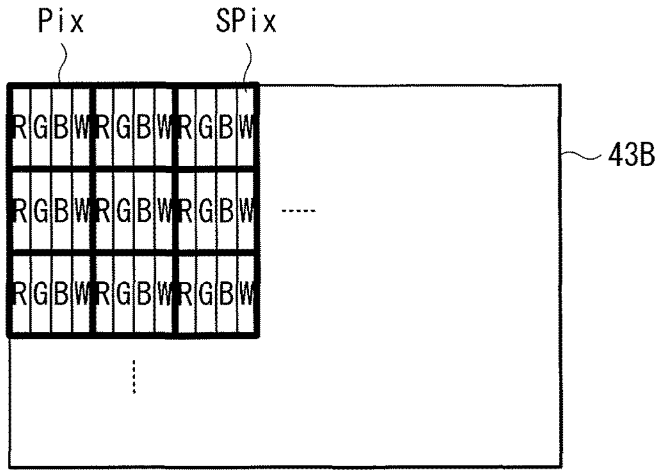
FIGS. 18A and 18B are schematic diagrams illustrating an operation example of a display control section according to the modification in FIG. 17.
Figure 18B:
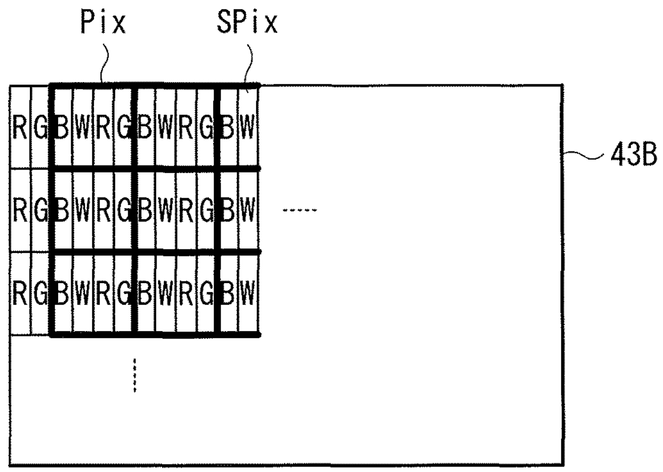

FIGS. 18A and 18B schematically illustrate control operation of a display control section 16B in the display 1B according to the present modification. FIG. 18A illustrates a case in which the image F4 is displayed, and FIG. 18B illustrates a case in which the image Fi4 is displayed. When it is determined that the image F4 is supplied, the display control section 16B performs control so that the four subpixels SPix of the configurational unit U (FIG. 17) form a pixel Pix, as illustrated in FIG. 18A. In other words, in this case, the red (R), green (G), blue (B), and white (W) subpixels SPix are arranged in this order from left in the pixel Pix. Further, when it is determined that the image Fi4 is supplied, the display control section 16B performs control so that the four subpixels SPix displaced by two subpixels SPix in the horizontal direction X form the pixel Pix, as illustrated in FIG. 18B. In other words, in this case, the blue (B), white (W), red (R), and green (G) subpixels SPix are arranged in this order from left in the pixel Pix.

Figure 19A:
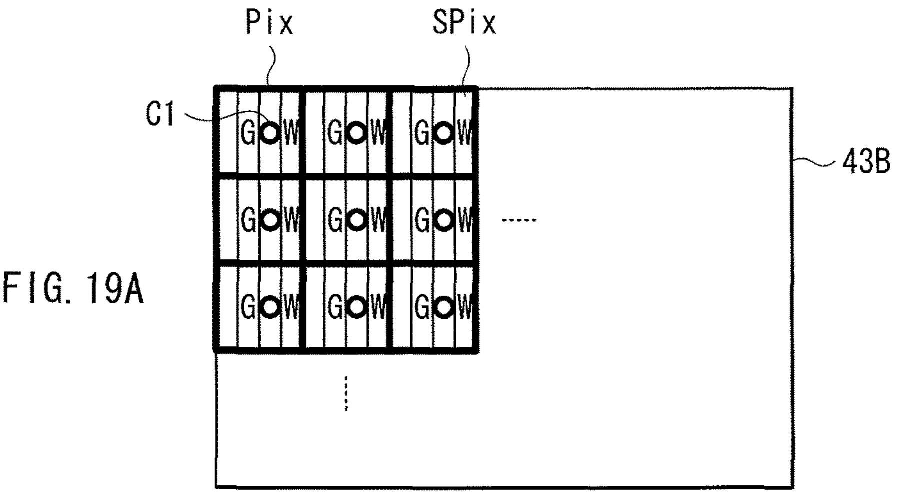
FIGS. 19A to 19C are schematic diagrams illustrating a characteristic example of the display control section according to the modification in FIG. 17.
Figure 19B:
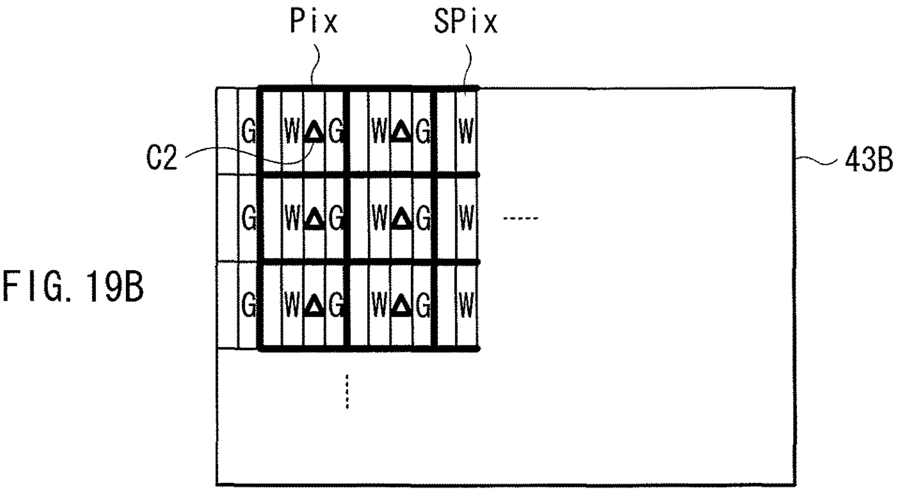
Figure 19C:
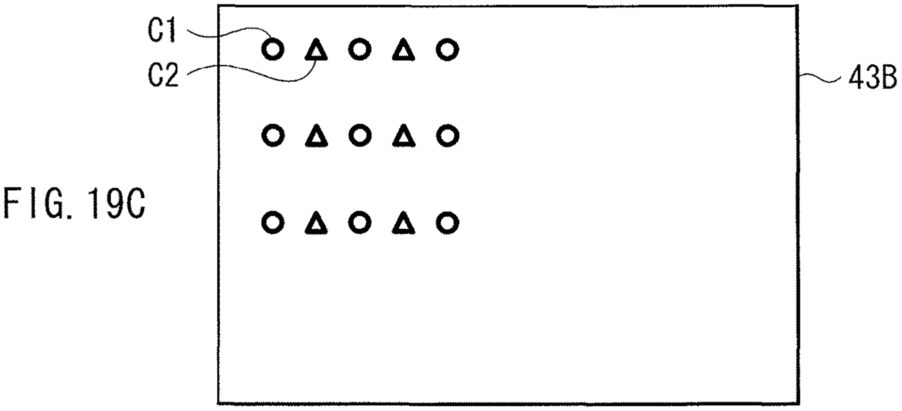

FIGS. 19A to 19C each illustrate a resolution of the display 1B according to the present modification. FIG. 19A illustrates the resolution of the display image D, FIG. 19B illustrates the resolution of the display image Di, and FIG. 19C illustrates the resolution of a mean image of the display images D and Di. The position of the luminance centroid in each of the pixels Pix is substantially as a midpoint (each of the coordinates C1 and C2) between the green (G) subpixel SPix and the white (W) subpixel SPix (FIGS. 19A and 19B). Therefore, when the display image D and the display image Di are alternately displayed, the luminance centroids C1 and C2 are displaced with respect to each other by two subpixels in the horizontal direction X, as illustrated in FIG. 19C. In other words, the resolution is improved to be double in the horizontal direction X, as compared with a case in which only the display image D is displayed repeatedly, for example.

Figure 20:
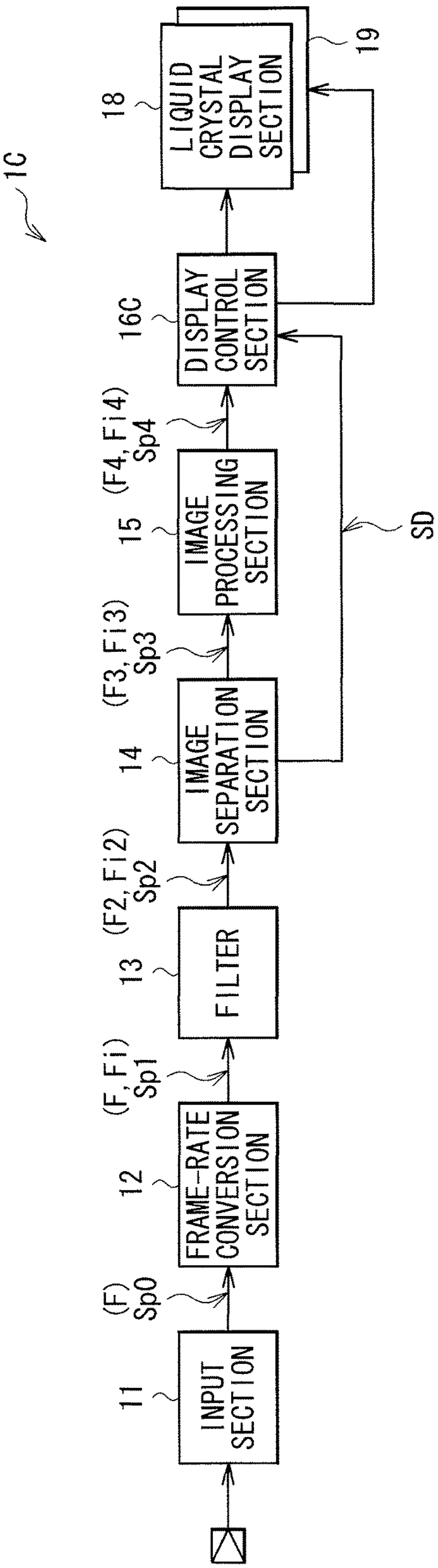
FIG. 20 is a block diagram illustrating a configuration example of a display according to still another modification.

Further, for instance, in each of the embodiments and the like, the EL display is configured, but the technology is not limited thereto. Alternatively, for example, a liquid crystal display may be configured as illustrated in FIG. 20. This is a display 1C configured by applying the display 1 according to the first embodiment to a liquid crystal display. The display 1C includes a liquid crystal display section 18, a backlight 19, and a display control section 16B that controls the liquid crystal display section 18 and the backlight 19.

It is to be noted that the technology may be configured as follows.

(1) A display including:

a display section including a plurality of subpixels; and a display driving section driving the display section, based on a first image data set and a second image data set that alternate with each other, wherein the display driving section assigns a predetermined number of subpixels to one pixel, performs first display driving based on the first image data set, and performs second display driving based on the second image data set, and a displacement equivalent to one or a plurality of subpixels is provided between a pixel to be driven by the first display driving and a pixel to be driven by the second display driving.

(2) The display according to (1), further including an image generation section including a frame-rate conversion section, the frame-rate conversion section performing frame rate conversion based on a series of input image data set, and the image generation section generating the first image data set and the second image data set based on image data subjected to the frame rate conversion.

(3) The display according to (2), wherein the image generation section generates a discrimination signal indicating whether the first image data set or the second image data set is generated, and the display driving section selectively performs the first display driving and the second display driving based on the discrimination signal.

(4) The display according to (2) or (3), wherein the predetermined number is four.

(5) The display according to (4), wherein the four subpixels are aligned by two in each of a first direction and a second direction intersecting the first direction.

(6) The display according to (5), wherein, between the pixel to be driven by the first display driving and the pixel to be driven by the second display driving, a displacement equivalent to one subpixel is provided in each of the first direction and the second direction.

(7) The display according to (5) or (6), wherein the image generation section further includes an image separation section, the frame-rate conversion section performs the frame rate conversion to generate a third image data set and a fourth image data set that alternate with each other, and the image separation section generates the first image data set by separating pixel data on odd-numbered coordinates at which a first coordinate in the first direction and a second coordinate in the second direction are both odd numbers, based on the third image data set, the image separation section also generating the second image data set by separating pixel data on even-numbered coordinates at which the first coordinate and the second coordinate are both even numbers, based on the fourth image data set.

(8) The display according to (7), wherein the image generation section further includes a filter, the filter smoothing pixel data of each of the third image data set and the fourth image data set, and the image separation section generates the first image data set based on the smoothed third image data set, and also generates the second image data set based on the smoothed fourth image data set.

(9) The display according to (7) or (8), wherein each of the third image data set and the fourth image data set includes pixel data four times in quantity a pixel number of the display section.

(10) The display according to (5) or (6), wherein the frame-rate conversion section, generates interpolation image data set by performing interpolation processing between pixels, based on four pieces of pixel data in the input image data set, the four pieces of pixel data being next to each other in the first direction and the second direction, uses one of the input image data set and the interpolation image data set, as the first image data set, and generates the second image data set by performing interpolation processing on a time axis on the other of the input image data set and the interpolation image data set.

(11) The display according to any one of (4) to (10), wherein the four subpixels include, a first subpixel, a second subpixel, and a third subpixel being associated with wavelengths different from one another, and a fourth subpixel emitting color light different from color light of each of the first subpixel, the second subpixel, and the third subpixel.

(12) The display according to (11), wherein the first subpixel, the second subpixel, and the third subpixel emit the color light of red, green, and blue, respectively, luminosity factor for the color light emitted by the fourth subpixel is equal to or higher than luminosity factor for the color light of green emitted by the second subpixel, and the second subpixel and the fourth subpixel are arranged to avoid being next to each other in each of the first direction and the second direction.

(13) The display according to (12), wherein the fourth subpixel emits the color light of white.

(14) The display according to (4), wherein the four subpixels are aligned by four in the first direction.

(15) The display according to (14), wherein a displacement equivalent to two subpixels in the first direction is provided between the pixel to be driven by the first display driving and the pixel to be driven by the second display driving.

(16) The display according to any one of (1) to (15), further including an image processing section performing predetermined image processing on the first image data set and the second image data set, wherein the display driving section performs display driving, based on the first image data set and the second image data set that have been subjected to the image processing.

(17) The display according to any one of (1) to (16), wherein each of the first image data set and the second image data set includes pixel data equal in quantity to a pixel number of the display section.

(18) The display according to any one of (1) to (17), wherein the display section is an EL display section.

(19) An image processing unit including:

a display driving section driving a display section, based on a first image data set and a second image data set that alternate with each other, wherein the display driving section assigns a predetermined number of subpixels to one pixel, performs first display driving based on the first image data set, and performs second display driving based on the second image data set, and a displacement equivalent to one or a plurality of subpixels is provided between a pixel to be driven by the first display driving and a pixel to be driven by the second display driving.

(20) A display method including:

assigning a predetermined number of subpixels to one pixel, for a display section including a plurality of subpixels;

performing first display driving based on a first image data set as well as performing second display driving based on a second image data set, the first image data set and the second image data set alternating with each other; and providing a displacement between a pixel to be driven by the first display driving and a pixel to be driven by the second display driving, the displacement being equivalent to one or a plurality of subpixels.

The disclosure contains subject matter related to that disclosed in Japanese Priority Patent Application JP 2012-134372 filed in the Japan Patent Office on Jun. 14, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A display, comprising:

circuitry configured to:

drive the display based on one of a first display drive or a second display drive, wherein the first display drive is based on a first image data set of a plurality of image data sets and the second display drive is based on a second image data set of the plurality of image data sets;

assign a set of subpixels among a plurality of subpixels of the display to one pixel of a plurality of pixels of the display; and display the first image data set and the second image data set alternately, wherein a first group of pixels from the plurality of pixels are associated with the first image data set, and a second group of pixels from the plurality of pixels are associated with the second image data set, and wherein a first displacement of at least one subpixel of the plurality of subpixels is provided between the first group of pixels driven by the first display drive and the second group of pixels driven by the second display drive.

2. The display according to claim 1, wherein the circuitry is further configured to:

convert frame rate based on the plurality of image data sets; and generate the first image data set and the second image data set, based on the plurality of image data sets subjected to the converted frame rate.

3. The display according to claim 2, wherein the circuitry is further configured to:

generate a discrimination signal that indicates generation of at least one of the first image data set or the second image data set; and select one of the first display drive or the second display drive to drive the display based on the discrimination signal.

4. The display according to claim 2, wherein the set of subpixels comprises four subpixels.

5. The display according to claim 1, wherein the set of subpixels is arranged as a matrix with two rows in a first direction and two columns in a second direction.

6. The display according to claim 5, wherein the first displacement of at least one subpixel is in each of the first direction and the second direction.

7. The display according to claim 5, wherein the circuitry is further configured to:

convert frame rate to generate a third image data set of the plurality of image data sets and a fourth image data set of the plurality of image data sets;

generate the first image data set based on separation of a first group of subpixels from a plurality of subpixels associated with the third image data set, wherein the first group of subpixels are positioned on odd-numbered coordinates of the display; and generate the second image data set based on separation of a second group of subpixels from a plurality of subpixels associated with the fourth image data set, wherein the second group of subpixels are positioned on even-numbered coordinates of the display.

8. The display according to claim 7, wherein the circuitry is further configured to:

smoothen a plurality of pixels associated with each image data set of the third image data set and the fourth image data set;

generate the first image data set based on the smoothed third image data set; and generate the second image data set based on the smoothed fourth image data set.

9. The display according to claim 7, wherein the plurality of pixels associated to each image data set of the third image data set and the fourth image data set includes four times a number of pixels in the plurality of pixels of the display.

10. The display according to claim 5, wherein the circuitry is further configured to:

generate interpolation image data set based on interpolation of four pixels in the plurality of image data sets, wherein the four pixels are consecutive pixels in one of the first direction or the second direction, determine one of an input image data set of the plurality of image data sets or the interpolation image data set, as the first image data set, and generate the second image data set based on interpolation on a time axis on another of the input image data set or the interpolation image data set.

11. The display according to claim 5, wherein the set of subpixels include, a first subpixel, a second subpixel, and a third subpixel that are associated with wavelengths different from one another, and a fourth subpixel that emits color light different from color light of each of the first subpixel, the second subpixel, and the third subpixel.

12. The display according to claim 11, wherein the first subpixel, the second subpixel, and the third subpixel emit red color light, green color light, and blue color light, respectively, wherein a luminosity factor for the color light emitted by the fourth subpixel is equal to or higher than a luminosity factor for the green color light emitted by the second subpixel, and wherein the second subpixel is arranged to avoid being next to the fourth subpixel, in each of the first direction and the second direction.

13. The display according to claim 12, wherein the fourth subpixel emits white light.

14. The display according to claim 1, wherein the set of subpixels are aligned in a first direction.

15. The display according to claim 1, wherein a second displacement of two subpixels in a first direction is provided between the plurality of subpixels driven by the first display drive and the plurality of subpixels driven by the second display drive.

16. The display according to claim 1, wherein each of the first image data set and the second image data set includes a number of pixels equal to a number of pixels of the display.

17. The display according to claim 1, wherein the display is an electroluminescence (EL) display.

18. An image processing unit, comprising:

circuitry configured to:

drive a display, based on one of a first display drive or a second display drive, wherein the first display drive is based on a first image data set of a plurality of image data sets and the second display drive is based on a second image data set of the plurality of image data sets;

assign a set of subpixels among a plurality of subpixels of the display to one pixel of a plurality of pixels of the display; and display the first image data set and the second image data set alternately, wherein a first group of pixels from the plurality of pixels are associated with the first image data set, and a second group of pixels from the plurality of pixels are associated with the second image data set, and wherein a displacement of at least one subpixel of the plurality of subpixels is provided between the first group of pixels driven by the first display drive and the second group of pixels driven by the second display drive.

19. A display method, comprising:

assigning a set subpixels among a plurality of subpixels of a display to one pixel of a plurality of pixels of the display;

driving a display based on one of a first display drive or a second display drive, wherein the first display drive is based on a first image data set of a plurality of image data sets and the second display drive is based on a second image data set of the plurality of image data sets, and wherein a first group of pixels from the plurality of pixels are associated with the first image data set, and a second group of pixels from the plurality of pixels are associated with the second image data set, displaying the first image data set and the second image data set alternately; and wherein a displacement of at least one subpixel of the plurality of subpixels is provided between the first group of pixels driven by the first display drive and the second group of pixels driven by the second display drive.

* * * * *